(12) United States Patent
Tsai et al.

(10) Patent No.: US 10,828,720 B2
(45) Date of Patent: Nov. 10, 2020

(54) FOIL-BASED ADDITIVE MANUFACTURING SYSTEM AND METHOD

(71) Applicant: The Curators of the University of Missouri, Columbia, MO (US)

(72) Inventors: Hai-Lung Tsai, Rolla, MO (US); Yiyu Shen, Rolla, MO (US); Yingqi Li, Rolla, MO (US); Chen Chen, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 102 days.

(21) Appl. No.: 15/951,268

(22) Filed: Apr. 12, 2018

(65) Prior Publication Data

US 2018/0229332 A1    Aug. 16, 2018

Related U.S. Application Data

(63) Continuation of application No. PCT/US2017/048168, filed on Aug. 23, 2017, which
(Continued)

(51) Int. Cl.
*B23K 26/244*    (2014.01)
*B32B 15/01*     (2006.01)
(Continued)

(52) U.S. Cl.
CPC ........ *B23K 26/244* (2015.10); *B23K 26/0604* (2013.01); *B23K 26/082* (2015.10);
(Continued)

(58) Field of Classification Search
CPC ................ B23K 26/244; B23K 26/082; B23K 26/0604; B23K 26/22; B23K 26/38;
(Continued)

(56) References Cited

U.S. PATENT DOCUMENTS 4,649,254 A * 3/1987 Bedell ................ B23K 26/0846
                                                      219/121.64
6,450,393 B1* 9/2002 Doumanidis ........... B23P 15/00
                                                      228/110.1
(Continued)

FOREIGN PATENT DOCUMENTS

JP       2007000888 A    1/2007
WO       92/16822 A2    10/1992

OTHER PUBLICATIONS

Chen et al., "A Foil-Based Additive Manufacturing Technology for Metal Parts," Transactions of the American Society of Mechanical Engineers (ASME), Aug. 24, 2016, vol. 139, pp. 024501-1 through 024501-6.
(Continued)

*Primary Examiner* — Christopher M Koehler
(74) *Attorney, Agent, or Firm* — Stinson LLP

(57) ABSTRACT

An additive manufacturing system, method of manufacturing, and fabricated part. The system uses a material joining laser system to join together foil sheets to form a metal part. The material joining laser system can be configured to join adjacent foil sheets together in a substantially uniform manner. The manufacturing system also includes a material removal system that removes material from selected locations of the foil sheets to shape the foil sheets to correspond with selective slices of the part. The material removal system can be a laser system, such as a laser system configured to remove material from a foil sheet without removing material from an underlying layer. One embodiment involves the manufacture of amorphous alloy components.

20 Claims, 17 Drawing Sheets

Related U.S. Application Data is a continuation-in-part of application No. PCT/US2015/055366, filed on Oct. 13, 2015.

(60) Provisional application No. 62/419,223, filed on Nov. 8, 2016.

(51) Int. Cl.
| | |
|---|---|
| *B23K 26/06* | (2014.01) |
| *B23K 26/082* | (2014.01) |
| *B23K 26/38* | (2014.01) |
| *B23K 26/22* | (2006.01) |
| *B33Y 10/00* | (2015.01) |
| *B33Y 30/00* | (2015.01) |
| *B33Y 70/00* | (2020.01) |
| *B23K 101/18* | (2006.01) |
| *B23K 103/04* | (2006.01) |

(52) U.S. Cl.
CPC .............. *B23K 26/22* (2013.01); *B23K 26/38* (2013.01); *B32B 15/011* (2013.01); *B23K 2101/18* (2018.08); *B23K 2103/04* (2018.08); *B32B 2307/702* (2013.01); *B33Y 10/00* (2014.12); *B33Y 30/00* (2014.12); *B33Y 70/00* (2014.12)

(58) Field of Classification Search
CPC ............ B23K 2101/18; B23K 2103/04; B32B 15/011; B32B 2307/702; B33Y 10/00; B33Y 30/00; B33Y 70/00
See application file for complete search history.

(56) References Cited

U.S. PATENT DOCUMENTS

| | | | | |
|---|---|---|---|---|
| 2005/0109740 | A1* | 5/2005 | Becker | B23K 26/10 219/121.64 |
| 2007/0170158 | A1* | 7/2007 | Greig | B23K 26/034 219/121.64 |
| 2008/0116175 | A1* | 5/2008 | Ballerini | B23K 26/0604 219/74 |
| 2011/0062221 | A1* | 3/2011 | Johnson | B23K 26/244 228/181 |
| 2012/0152398 | A1* | 6/2012 | Laymon | F16L 13/02 138/155 |
| 2013/0088074 | A1* | 4/2013 | Denney | B23K 26/20 301/64.303 |
| 2013/0105447 | A1* | 5/2013 | Haake | B23K 26/34 219/76.14 |
| 2015/0121962 | A1* | 5/2015 | Jiang | C03B 33/07 65/102 |
| 2015/0136318 | A1* | 5/2015 | Tiefel | B32B 38/0008 156/272.8 |
| 2015/0137412 | A1* | 5/2015 | Schalansky | B22F 3/1055 264/129 |
| 2015/0142160 | A1* | 5/2015 | Ohnishi | B29C 64/141 700/119 |

OTHER PUBLICATIONS

International Preliminary Report on Patentability, PCT/US2015/055366, dated Apr. 17, 2018, 9 pages.
International Search Report, PCT/US2015/55366, dated Jan. 6, 2016, 3 pages.
Written Opinion, PCT/US2015/55366, dated Jan. 6, 2016, 7 pages.
International Search Report, PCT/US2017/048168, dated Nov. 2, 2017, 2 pages.
Written Opinion, PCT/US2017/048168, dated Nov. 2, 2017, 8 pages.

\* cited by examiner

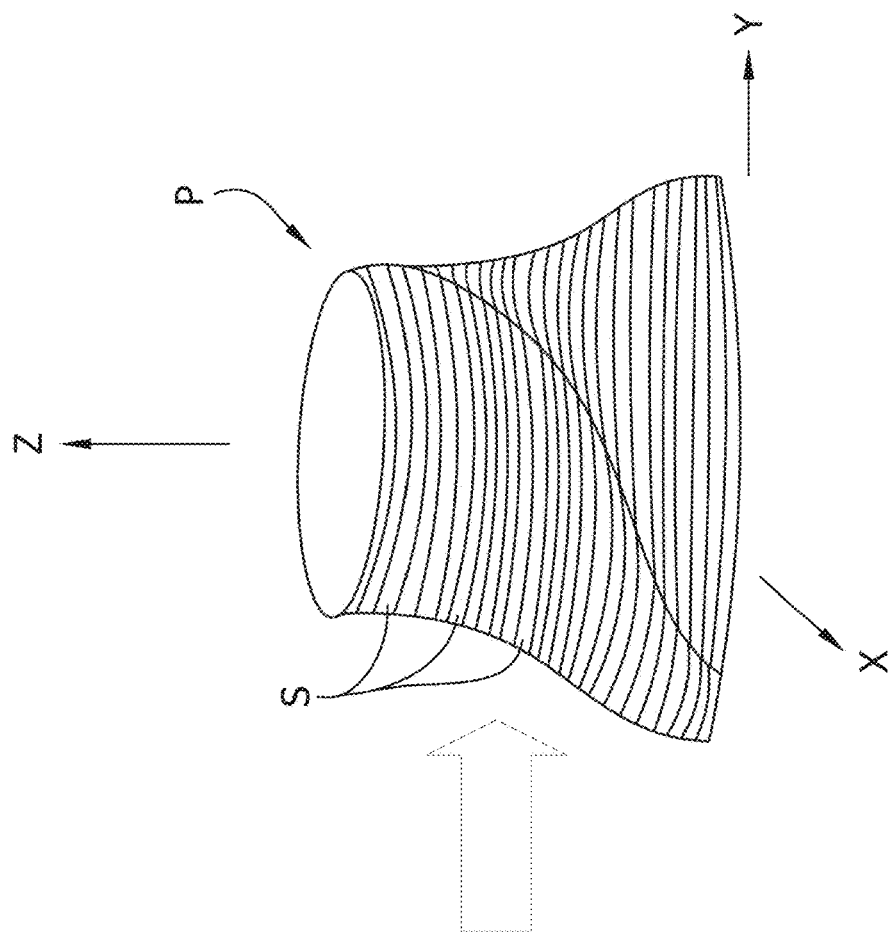
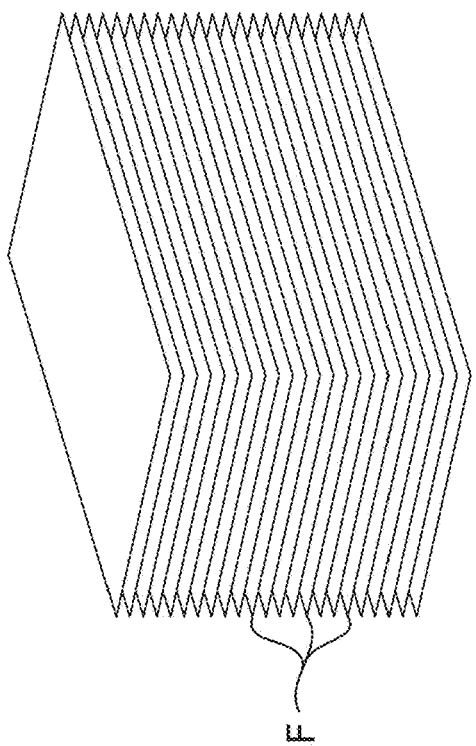
FIG. 2

FOIL-BASED ADDITIVE MANUFACTURING SYSTEM AND METHOD

REFERENCE TO RELATED APPLICATIONS

This application is a continuation-in-part application of PCT/US2015/055366 filed Oct. 13, 2015 published as WO 2017/065751, and is also a continuation of PCT/US2017/048168 filed Aug. 23, 2017, which claims priority to U.S. provisional application 62/419,223 filed Nov. 8, 2016, the entire disclosures of which are incorporated by reference.

STATEMENT OF GOVERNMENT INTEREST

This invention was made with government support under FE0012272 awarded by Department of Energy. The government has certain rights in the invention.

FIELD

The present invention generally relates to a system and method for additive manufacturing and more specifically to manufacturing of metal parts from foil sheets.

BACKGROUND

Additive manufacturing technologies, such as three-dimensional printing, are widely used in various industries and are regularly being adopted by new industries and for new applications. Various additive manufacturing technologies include stereo-lithography, fused deposition modeling, laminated object manufacturing, selective laser sintering, selective laser melting, laser engineered net shaping, direct metal deposition, electron beam melting, etc. These technologies can be used to manufacture articles from various materials such as resin, wax, polymer, plastic, ABS, polycarbonate material, metal powder, etc. Metal parts have proven more difficult to manufacture using additive manufacturing techniques than parts made from other materials. It is particularly difficult to manufacture a metal part using additive manufacturing in a way that yields material properties consonant with parts made using traditional metal machining techniques.

Most metal additive manufacturing processes are powder based. In selective laser sintering, metal powders are deposited in layers that correspond in shape with slices of the resulting part and are sintered or fused together. Layer by layer, the laser fuses the powder to form the three-dimensional part. Although a wide range of materials can be used in selective laser sintering, the manufacturing tolerance of the resulting part is limited by the size of the powdered metal particles. Moreover, the mechanical strength of as-fabricated parts is far below that of the raw material. Furthermore, powder-based processes face environmental, safety, and handling challenges associated with handling fine powders.

In laser engineered net shaping and direct metal deposition, a metal part is formed by depositing metal powders in a specific location and then melting the powder. These processes are compatible with many materials, such as stainless steel, nickel alloy, tool steel, copper alloys, and combinations thereof. The laser engineered net shaping process can also be used to repair damaged metal parts. But in these powder melting techniques, uneven heating and cooling processes introduce residual stresses into the manufactured part. Typically, the finished parts have a poor surface quality that requires an additional finishing process.

Laminated object manufacturing is a foil-based process that combines additive and subtractive techniques to build a part, layer upon layer. Initially, laminated object manufacturing processes formed parts from paper bonded together by binders under pressure and heat. The technology was later extended to metal foils, using high powered ultrasonic waves to fuse the foil sheets together. After the foil sheets are fused together, a milling tool is used to cut or trim the foil to the desired shape. The advantages of laminated object manufacturing include low cost per part, low material deformation, and scalability. But the material removal processes are known to produce a large amount of waste, and the mechanical strength of the fabricated parts is typically directional in nature, usually being concentrated along a vertical axis (in the direction perpendicular to the foil surface) so that the part is relatively weak along horizontal axes.

Microstructure, processing history, and composition are primary influences on material properties. Amorphous metals are metals lacking a crystalline microstructure which is present in traditionally prepared metals. Amorphous metals are also known as metallic glasses. Whereas atoms in crystallized metals are arranged in periodic arrays known as crystal lattices which are organized and structured, atoms in amorphous metals are present in a random and disordered manner. An amorphous microstructure can impart certain superior properties to an alloy in comparison to a traditional crystalline alloy. For example, an amorphous alloy may have greater hardness (wear resistance), corrosion resistance, and strength, as well as a lower coefficient of thermal expansion than crystalline alloys. A lower coefficient of thermal expansion can be a great advantage for components manufactured for use in extreme temperature environments, such as precision aerospace components.

In order to impart an amorphous microstructure, it is necessary to so rapidly quench a liquid alloy that crystallization is bypassed during cooling. But cooling rate is limited in thicker parts, such that thickness is very limited in components which can be manufactured with a fast enough cooling rate through the part to achieve amorphous microstructure. And cooling rate is non-uniform through the bulk of parts with complex geometries. Accordingly, heretofore it has only been possible to impart amorphous microstructure in the manufacture of components which are a few millimeters or less thick. And such manufacture has been limited to simple geometries, such as ribbons, foils, thin plates, wires, and thin rods.

SUMMARY

Briefly, therefore, the invention is directed to a method of manufacturing a metal alloy component comprising multiple slices of alloy foil sheets including a first alloy foil sheet, an nth alloy foil sheet, and a plurality of intermediate alloy foil sheets, the method comprising sequentially stacking each of the n alloy foil sheets on top of each other such that each of the n alloy foil sheets engages a respective underlying layer comprising another of the n alloy foil sheets; joining each of the n alloy foil sheets to the respective underlying layer using a material joining laser after each respective sheet is stacked on the respective underlying layer by striking a focused laser beam of the laser on a free, unobstructed surface of the foil sheet to melt and weld each alloy foil sheet to its respective underlying layer; and removing material away from one or more of the n alloy foil sheets to shape said one or more of the n alloy foil sheets to correspond in shape with one or more respective slices of the metal alloy component. The steps of joining each of the n alloy foil sheets to the respective underlying layer and removing alloy material from said one or more of the n alloy foil sheets are controlled based on shape data indicative of a shape of each of the n slices of the metal alloy component.

In another aspect, the invention is directed to a method of manufacturing an amorphous metal alloy component comprising slices of amorphous alloy foil sheets including a first amorphous alloy foil sheet, an nth amorphous alloy foil sheet, and a plurality of intermediate amorphous alloy foil sheets, the method comprising sequentially stacking each of the n amorphous alloy foil sheets on top of each other such that each of the n amorphous alloy foil sheets engages a respective underlying layer comprising another of the n amorphous alloy foil sheets; joining each of the n amorphous alloy foil sheets to the respective underlying layer using a material joining laser after each respective sheet is stacked on the respective underlying layer by striking a focused laser beam of the laser on a free, unobstructed surface of the foil sheet to melt and weld each amorphous alloy foil sheet to its respective underlying layer; and removing material away from one or more of the n amorphous alloy foil sheets to shape said one or more of the n alloy foil sheets to correspond in shape with one or more respective slices of the metal alloy component. The steps of joining each of the n alloy foil sheets to the respective underlying layer and removing amorphous alloy material from said one or more of the n amorphous alloy foil sheets are controlled based on shape data indicative of a shape of each of the n slices of the metal amorphous alloy component.

The invention is also directed to a method of manufacturing an amorphous metal alloy component comprising n slices from n amorphous alloy foil sheets including a first amorphous alloy foil sheet, an nth amorphous alloy foil sheet, and a plurality of intermediate amorphous alloy foil sheets, the method comprising sequentially stacking each of the n amorphous alloy foil sheets on top of each other such that each of the n amorphous alloy foil sheets engages a respective underlying layer comprising another of the n amorphous alloy foil sheets; preliminarily attaching each foil sheet to the respective underlying layer by spot welding; joining each of the n amorphous alloy foil sheets to the respective underlying layer using a material joining laser after each respective sheet is stacked on the respective underlying layer by striking a focused laser beam of the laser on a free, unobstructed surface of the foil sheet to melt and weld each amorphous alloy foil sheet to its respective underlying layer; and cutting material away from one or more of the n alloy foil sheets by slicing through the foil sheet and separating foil sheet segments not joined to the underlying layer to shape said one or more of the n alloy foil sheets to correspond in shape with one or more respective slices of the metal alloy component. The joining is performed in a cooling chamber having an internal temperature below at least about minus 50° C. During joining the material joining laser is applied to the free, unobstructed surface of the foil sheet a) in sequential paths that do no overlap weld paths formed immediately prior, to reduce heat accumulation, or b) by forming spot welds on the entire surface with each successive spot weld being formed where it does not overlap with an immediately previously formed spot weld to reduce heat accumulation. The steps of joining each of the n alloy foil sheets to the respective underlying layer and removing amorphous alloy material from said one or more of the n amorphous alloy foil sheets are controlled based on shape data indicative of a shape of each of the n slices of the metal amorphous alloy component.

The invention is also directed to a method of manufacturing a metal alloy component comprising n slices from n alloy foil sheets including a first alloy foil sheet, an nth alloy foil sheet, and a plurality of intermediate alloy foil sheets, the method comprising sequentially stacking each of the n alloy foil sheets on top of each other such that each of the n alloy foil sheets engages a respective underlying layer comprising another of the n alloy foil sheets; preliminarily attaching each of the n alloy foil sheets to the respective underlying layer to secure a position of the each foil sheet onto the underlying layer; joining each of the n alloy foil sheets to the respective underlying layer using a material joining laser after each respective sheet is stacked on the respective underlying layer; and removing material away from one or more of the n alloy foil sheets to shape said one or more of the n alloy foil sheets to correspond in shape with one or more respective slices of the metal alloy component. The steps of joining each of the n alloy foil sheets to the respective underlying layer and removing alloy material from said one or more of the n alloy foil sheets are controlled based on shape data indicative of a shape of each of the n slices of the metal alloy component.

In another aspect, the invention is directed to a method of manufacturing a metal alloy component comprising n slices from n alloy foil sheets including a first alloy foil sheet, an nth alloy foil sheet, and a plurality of intermediate alloy foil sheets, the method comprising sequentially stacking each of the n alloy foil sheets on top of each other such that each of the n alloy foil sheets engages a respective underlying layer comprising another of the n alloy foil sheets; joining each of the n alloy foil sheets to the respective underlying layer using a material joining laser after each respective sheet is stacked on the respective underlying layer; and cutting material away from one or more of the n alloy foil sheets by slicing through the foil sheet and separating foil sheet segments not joined to the underlying layer to shape said one or more of the n alloy foil sheets to correspond in shape with one or more respective slices of the metal alloy component. The steps of joining each of the n alloy foil sheets to the respective underlying layer and removing alloy material from said one or more of the n alloy foil sheets are controlled based on shape data indicative of a shape of each of the n slices of the metal alloy component.

Other objects and features will be in part apparent and in part pointed out hereinafter.

BRIEF DESCRIPTION OF THE DRAWINGS

FIG. 2 is a perspective comparing a stack of foil sheets to a part manufactured from the foil sheets using the additive manufacturing system;

DETAILED DESCRIPTION

Figure 1:
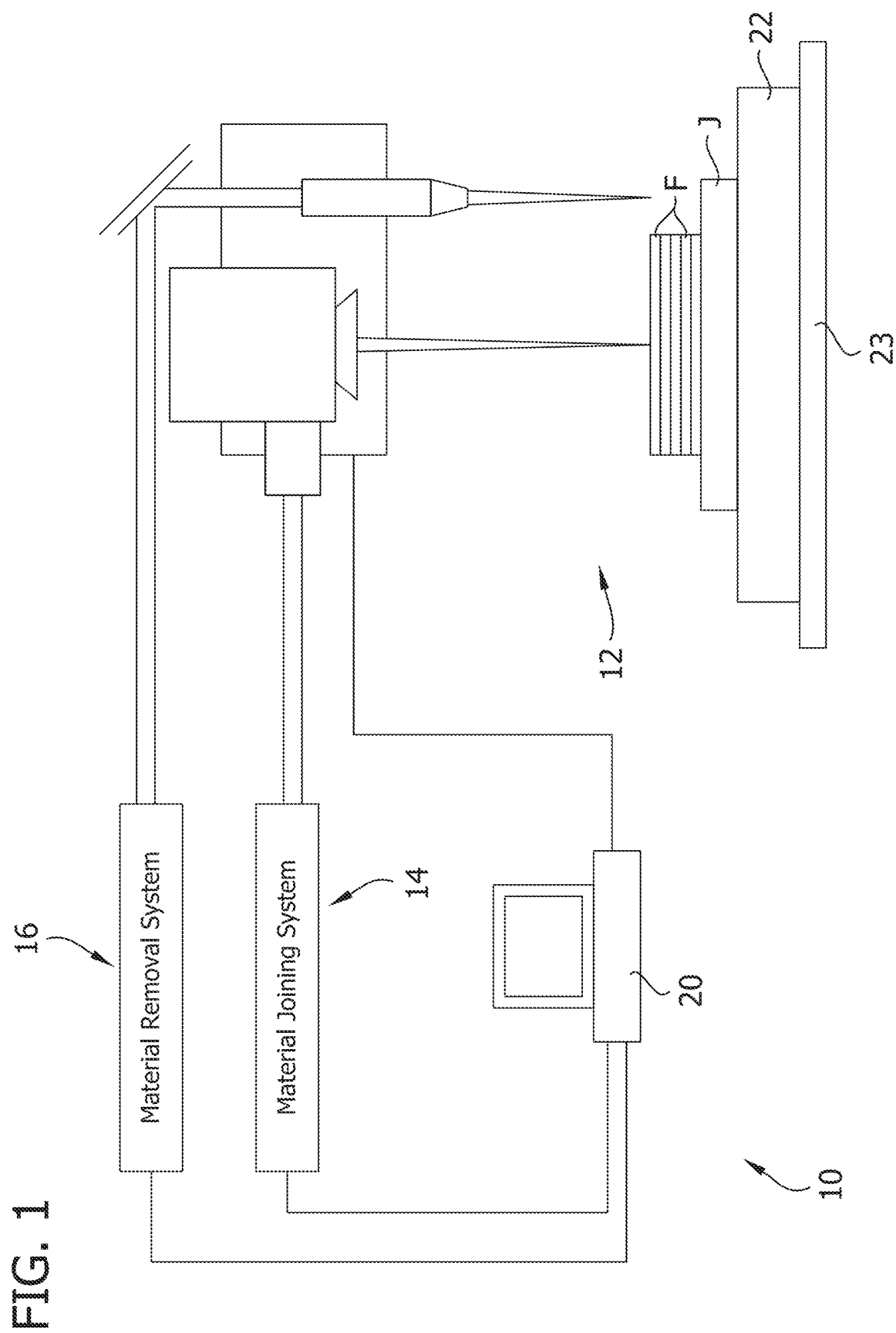
FIG. 1 is a schematic block diagram of an additive manufacturing system.

Referring to FIGS. 1 and 2, an additive manufacturing system for manufacturing a three-dimensional metal part P is generally indicated at reference numeral 10. As will be explained in further detail below, the manufacturing system 10 forms the part P by stacking, shaping, and joining together a plurality of foil sheets F. The manufacturing system 10 includes a foil sheet positioning system, generally indicated at 12, material joining system, generally indicated at 14, and material removal system, generally indicated at 16, that operate together to form the part P from the foil sheets F. A controller 20 is operatively connected to the foil sheet positioning system 12, material joining system 14, and material removal system 16 to control the system 10 to manufacture the part P based on a three-dimensional model of the part.

Referring to FIG. 2, the three-dimensional part P can be characterized as n slices S of material that form the part. Each slice S has a thickness extending along a z-axis a shape extending in a horizontal plane defined by x and y axes oriented orthogonal to the z axis. As will be explained in further detail below, the manufacturing system 10 is configured to manufacture the part P from n foil sheets F that are joined together and shaped to correspond in shape with respective slices S of the metal part. Each of the foil sheets F has the same thickness as one of the slices S of the part P. The foil sheets F are shown as a stack of rectangular sheets in FIG. 2 to represent how the foil is layered in use. But typically the foil sheets F will be removed from one or more rolls of foil. Although the illustrated sheets F have the same dimensions, sheets of different dimensions can also be used without departing from the scope of the invention. The thicknesses of each layer used in constructing the component need not be the same. For example, one or more of the n foil sheets may have a different thickness than others of the n foil sheets. In addition, one or more of the n foil sheets may be made from a different material than others of the n foil sheets. Where slices S of the part P comprise different materials at different locations, foil sheets of different materials may be used to form an individual slice. That is, the invention encompasses making components which are composites of two or more different materials assembled from foils of differing compositions.

Throughout this disclosure, the variable 'n' is used to refer to a number of slices S that form at least a portion of the part P, which portion is manufactured by layering, shaping, and joining together 'n' foil sheets F. In some embodiments, the 'n' foil sheets may be joined together to form the entire part P. In other embodiments, the 'n' foil sheets are joined together to form only a portion of the part P and are further joined to another piece (e.g., a foil sheet not included in the n foil sheets, a substrate, etc.) to form the entire part. In general, the manufacturing system 10 will manufacture the part P from four or more sheets of foil F (i.e., n≥4, e.g., from 4 to about 25, 4 to about 40, 4 to about 50, 4 to about 75, 4 to about 100, 4 to about 150, 4 to about 200, 4 to about 500, 4 to about 1000, 4 to about 5000, 4 to about 10,000, 4 to about 25,000, or more), including a first foil sheet, an nth foil sheet, and a plurality of intermediate foil sheets layered between the first and nth foil sheets. But particularly thin parts can be manufactured from fewer than four sheets without departing from the scope of the invention.

The foil sheets F can comprise any suitable metal material. In certain embodiments, the foil sheets F comprise a steel, such as AISI 1010 steel. An exemplary steel foil is 1010 steel, UPC No. 16850, available from Precision Brand Products, Inc. of Downers Grove, Ill. In one or more preferred embodiments, the foil sheets F have a thickness of from about 50 µm to about 750 µm (e.g., about 150 µm). Foil sheets of other thickness can also be used without departing from the scope of the invention.

Referring again to FIG. 1, the foil positioning system 12 includes a base 22 configured to support the foil sheets F that form the part P. In a preferred embodiment, the base 22 comprises a platform operatively connected to a movement stage 23 for moving the platform along the x and y axes. In other embodiments, the platform may be static or may move along any one, two, or three of the x, y, and z axes without departing from the scope of the invention.

In certain embodiments, a joining substrate J is positioned on the base 22 before the n foil sheets F are layered on the base. The first foil sheet F is stacked onto the substrate J so that the first foil sheet forms one layer and the substrate forms an underlying layer. Preferably, the substrate J is suitable for being joined to the first foil sheet F by welding. The substrate J can be thicker than each of the foil sheets F. For example, in one or more embodiments, the substrate J has a thickness of from about 2 mm to about 25 mm (e.g., about 3 mm). The substrate J can also be thicker or thinner without departing from the scope of the invention. If the substrate J is to be joined to the foil sheets F, it is preferably either shaped to correspond with a portion of the metal part P or removed from the part after fabrication. In some embodiments, the manufacturing system 10 can shape the substrate J after it is positioned on the platform 22. In other embodiments, the substrate J is shaped before being positioned on the platform 22.

In the illustrated embodiment, the foil sheets F are manually loaded onto the substrate J. For example, sheets of foil F taken from a roll are positioned, one at a time, atop the substrate J. As will be explained in further detail below, after each sheet F is loaded onto the platform 22, the material joining system 14 and the material removal system 16 are used to join the sheet to the underlying layer and to shape the sheet to correspond in shape with a slice S of the part P. It will be understood that an automated sheet loading system (not shown) could be used to place the foil sheets F onto the base without departing from the scope of the invention.

Figure 3:
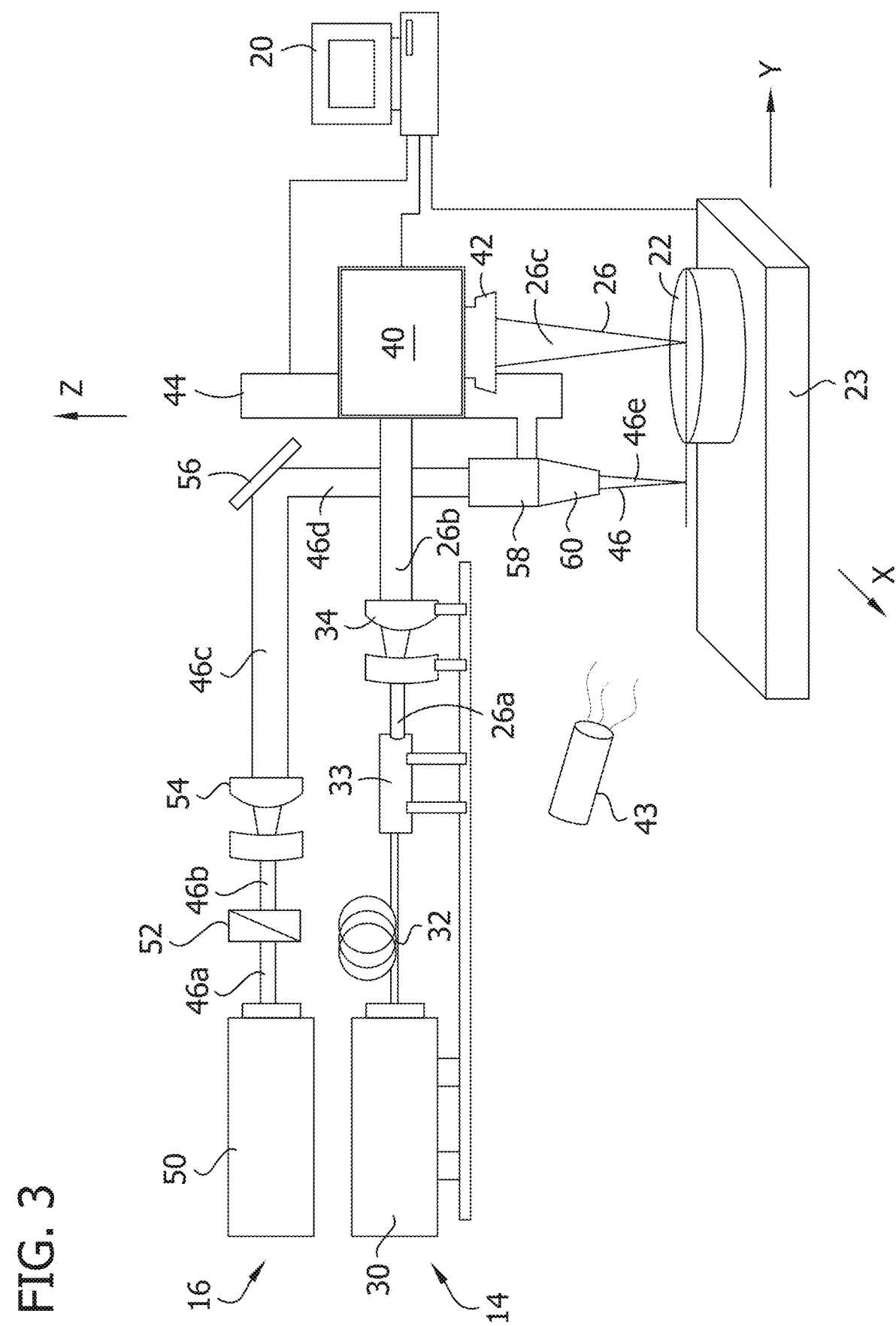
FIG. 3 is a more detailed schematic block diagram of the additive manufacturing system.

Referring to FIG. 3, in the illustrated embodiment, the joining system 14 is a material joining laser system configured to generate a material joining laser 26. In other embodiments, other types of material joining systems may be used without departing from the scope of the invention. The material joining laser system is configured to generate a material joining laser 26 that is configured to join each of the n foil sheets F to an underlying layer. For each of the foil sheets F, an "underlying layer" can comprise a substrate or an underlying foil sheet that engages and directly underlies the respective foil sheet. As will be explained in further detail below, the material joining laser system 14 is preferably controlled by the controller 20 to join each of the n foil sheets to its respective underlying layer in a substantially uniform manner. This produces strong bonding among the slices of the part P, for a high strength metal part whose strength is not directionally dependent.

Any suitable joining laser system (e.g., a gas laser system, a solid state laser system, etc.) may be used for the material joining laser system 14. The choice of joining laser system type can depend on such factors as cost, desired welding quality, and foil type, etc. The illustrated material joining laser system 14 includes a laser generator 30, an optical fiber 32, laser coupler 33, and beam expander 34. The laser generator 30 is preferably configured to generate a constant wavelength laser 26. In some embodiments, the laser generator is configured to generate a material joining laser 26 having a wavelength (e.g., a constant wavelength) of from about 355 nm to about 10,640 nm (e.g., about 1070 nm) in continuous wave mode. In certain preferred embodiments, the material joining laser generator 30 is a fiber laser generator. The laser generator 30 can, in one or more embodiments, be configured to generate a material joining laser 26 with a maximum power of from about 200 W to about 2000 W (e.g., about 1000 W). One suitable laser generator 30 is an IPG YLR-1000 CW fiber laser generator, available from IPG Photonics Corporation of Oxford, Mass.

In the illustrated embodiment, the optical fiber 32 is optically coupled between the laser generator 30 and the laser coupler 33 to transmit the material joining laser 26 from the laser generator to the laser coupler. An initial segment 26a of the material joining laser 26 extends generally along the y axis from the laser coupler 33 to the beam expander 34, which increases the beam size of a second segment 26b of the laser 26. The second segment 26b extends further along the y axis toward a scanner 40. As will be discussed in further detail below, the scanner 40 is configured to orient a third, welding segment 26c of the material joining laser 26 to extend generally along the z axis and to move the welding segment along the x and y axes. The welding segment 26c passes through a focusing lens 42 which focuses the material joining laser 26 at a beam spot.

The focusing lens 42 is configured to focus the material joining laser 26 for welding each of the foil sheets F to its respective underlying layer. The focusing lens 42 has a focal length which focuses the welding segment 26c on a beam spot spaced apart from the focusing lens 42 along the z axis. In certain embodiments, the focal length is from about 10 cm to about 580 cm (e.g., about 33 cm). The beam spot of the material joining laser 26 has a spot diameter. Preferably, the spot diameter is less than or equal to the thickness of each of the foil sheets F. For example in one or more embodiments, the ratio of the foil sheet thickness to the spot diameter is from about 0.1 to about 10.

In the illustrated embodiment, the focusing lens 42 and scanner 40 are mounted on a z-movement stage 44 configured to move the focusing lens 42 and scanner 40 relative to the platform 22 along the z axis. Preferably, the controller is operatively connected to the z-movement stage 44 to automatically operatively align the beam spot with each successive foil sheet as it is stacked upon the platform 22. Thus, the z-movement stage 44 preferably moves the focusing lens 42 and scanner 40 upward along the z axis each time a new foil sheet F is stacked upon the platform 22. The z-movement stage is broadly understood to be part of a material joining movement system configured to selectively move the platform 22 and material joining laser 26 relative to one another along the x, y, and z axes (the x and y movement components of the material joining movement system are discussed in further detail below). Other ways of moving the base and material joining laser relative to one another along the z axis to operatively align the beam spot of the material joining laser with each successive foil sheet as it is added to the base may also be used without departing from the scope of the invention. Accordingly, there are embodiments where the laser moves in the z-direction relative to the base, embodiments where the base moves in the z-direction relative to the laser, and embodiments where both the base and laser move in z-direction relative to each other.

The material joining laser 26 is preferably configured to penetrate each of then foil sheets F in a keyhole penetration mode (i.e., the material joining laser 26 has a laser intensity of greater than about $1 \times 10^4$ W/cm$^2$, e.g., $1.1 \times 10^6$ W/cm$^2$). In the illustrated embodiment, the material joining laser system 14 includes a shielding gas dispenser 43 that dispenses shielding gas toward the beam spot to enhance material joining. Shielding gas (e.g., argon, helium, etc.) is dispensed during welding to prevent oxidation. It will be understood that the illustrated material joining laser system 14 is but one exemplary embodiment of a system that is suitable for joining successive foil sheets F to one another in a substantially uniform manner. Other suitable material joining systems such as other types of laser welding systems, etc., may also be used without departing from the scope of the invention.

Figure 4:
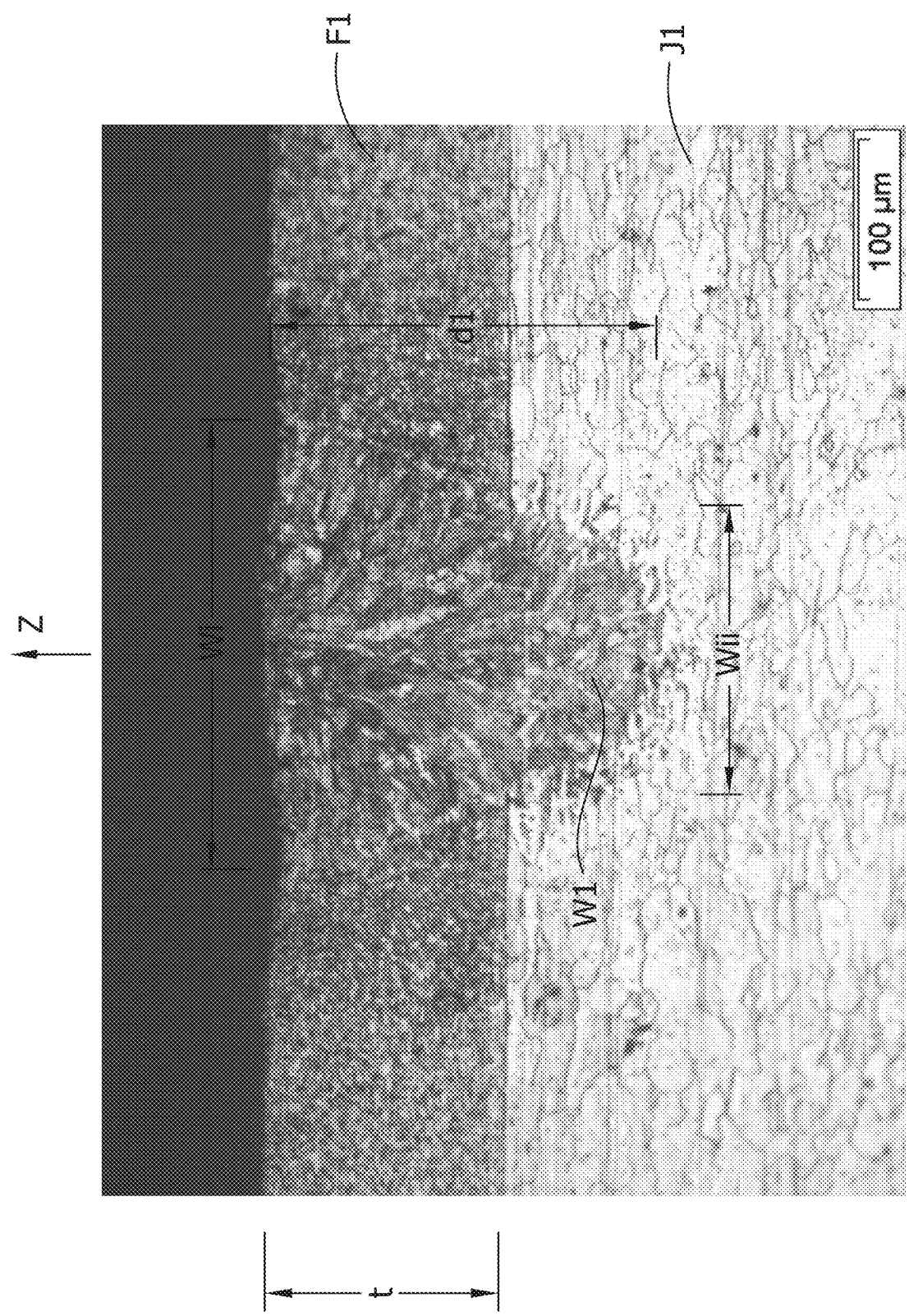
FIG. 4 is photograph illustrating a cross section of a weld formed by the additive manufacturing system that joins a foil sheet to a substrate.

Referring to FIG. 4, an exemplary weld W1 formed by the material joining laser system 14 joins a foil sheet F1 to a substrate layer J1. The weld W1 has a depth d1 that is larger than a thickness t of the foil sheet F1. It will be understood that the size and shape of the weld W1 is determined by various factors such as the materials being joined, laser power, laser wavelength, scanning speed, beam spot size, shielding gas type, etc. In one or more preferred embodiments, the depth d1 of the weld W1 is at least about 130% of the thickness t of the foil sheet F1. In the illustrated example, the weld W1 is about 130% of the thickness t of the foil sheet F1. The weld W1 has a width Wi at the top surface of the foil sheet F1. In one or more embodiments the width Wi is from about 80% to about 200% of the thickness t of the foil sheet F1. In the illustrated example, the width Wi is about 175% of the thickness t. The weld W1 also has a width Wii at the interface between the foil sheet F1 and the underlying layer J1. In one or more embodiments the width Wii is from about 80% to about 150% of the thickness t of the foil sheet F1. In the illustrated example, the width Wii is about 115% of the thickness t. In other embodiments, the material joining system is configured to form welds having other shapes and dimensions without departing from the scope of the invention.

In the illustrated embodiment, the scanner 40 controls the x and y axes movement between the material joining laser 26 and the base 22. Thus, in the illustrated embodiment, the scanner 40 and the z-movement stage 44 function together as a material joining movement system configured to selectively move the platform 22 and material joining laser 26 relative to one another along the x, y, and z axes to control the position of the material joining laser with respect to the sheets of foil F positioned on the platform. Although a laser scanner is used to control x and y axis movement in the illustrated embodiments, other embodiments can include material joining movement systems with other types of x and y axis control, such as by using the x-y movement stage, etc., without departing from the scope of the invention. In a preferred embodiment, the material joining movement system moves one of the base 22 and material joining laser 26 relative to the other at a rate of from about 350 mm/min to about 700 mm/min.

Before joining each foil sheet F to the underlying layer in a substantially uniform manner, the additive manufacturing system 10 is configured to temporarily or preliminarily fix or attach the foil sheet to the underlying layer. In one or more embodiments, each time a foil sheet F is loaded onto the platform 22, the controller 20 is configured to control the laser generator 30 and scanner 40 to spot weld the new foil sheet to the underlying layer. The scanner 40 moves the material joining laser 26 along the x and y axes and the laser generator 30 delivers the material joining laser 26 to form spot welds at spaced apart locations along the respective foil sheet F. The spot welds provide temporary attachment between the foil sheet F and its underlying layer. Further details of one such spot welding operation are provided below in connection with the discussion of manufacturing amorphous alloy components. Other ways of temporarily or preliminarily attaching the foil sheet to its underlying layer (e.g., clamping, mechanically fastening, screwing, etc.) can also be used without departing from the scope of the invention. The invention therefore involves preliminarily or temporarily attaching each of the alloy foil sheets to the respective underlying layer to secure a position of the each foil sheet onto the underlying layer in preparation for a subsequent joining operation. One purpose of this attachment is to secure the fresh foil in close contact with the underlayer and eliminate any gap between the layers to be welded together. This is necessary to ensure that the subsequent joining operation welds and does not burn. Also, this preliminary attachment prevents the foil layer being attached from curving up due to thermal stresses. In some embodiments, the attachment is temporary in the sense of a clamp or other system which does not form part of the eventual bond between the layers. In other embodiments, the attachment is preliminary in the sense of a spot weld or other system which does form part of or at least get integrated into the eventual bond between the layers.

Figure 5:
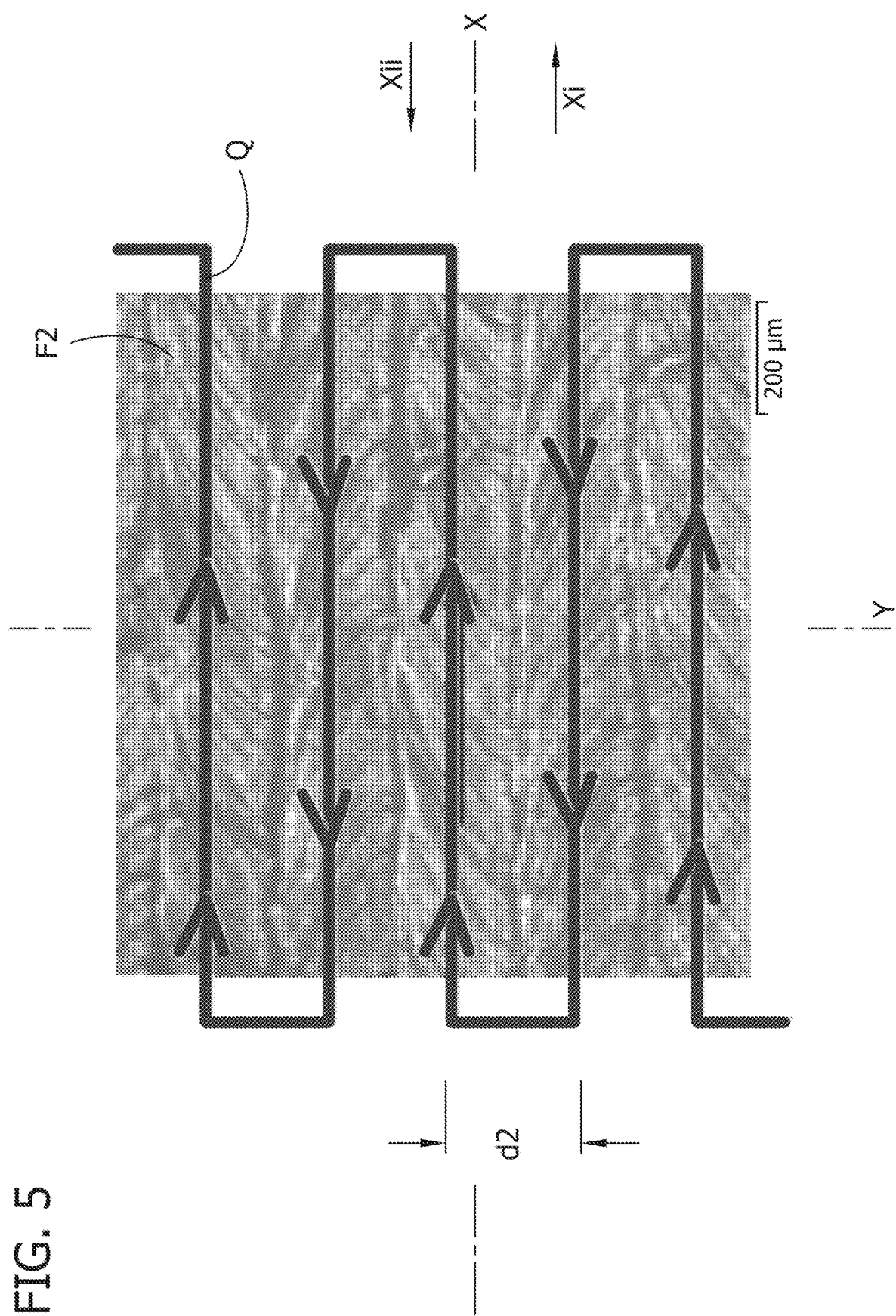
FIG. 5 is a photograph illustrating a top surface of a foil sheet after being welded to an underlying layer by the additive manufacturing system.

After preliminarily or temporarily fixing the foil sheet F to the underlying layer, the material joining laser system 14 is configured to join the foil sheet to the underlying layer in a substantially uniform manner. As shown in FIG. 5, the controller 20 is operatively connected to the scanner 40 to control the scanner to move the welding segment 26c of the material joining laser 26 relative to the foil sheet F2 along a welding path Q. The welding path Q is preferably configured so that, by causing the material joining laser 26 to travel along the welding path at a suitable scanning rate in operative alignment the foil sheet F along the z axis, the material joining laser forms a weld across the foil sheet that joins the foil sheet to the underlying layer in a substantially uniform manner.

In the illustrated embodiment, the weld path Q includes a plurality of parallel segments. Each segment extends along the x axis, and the segments are spaced apart from an adjacent segment along the y axis. Beginning outboard of one end of a foil sheet F2, the scanner 40 moves the material joining laser 26 along the x axis in a first direction $x_i$ at a scanning rate until the laser 26 passes over the opposite end of the foil sheet. The scanner 40 then moves the material joining laser 26 along the y axis a distance d2, before scanning along the x axis in an opposite second direction $x_{ii}$. The scanner 40 moves the material joining laser 26 in the second direction $x_{ii}$ until it passes over the first end of the foil sheet F2 and then again moves the laser along the y axis a distance d2. The scanner 40 repeats these steps until the weld path Q spans the entire distance of the foil sheet F2 along the y axis.

For clarity, the illustrated weld path Q is shown as sequentially traversing adjacent path segments. However, in certain preferred embodiments, the weld path will travel along a first path segment and subsequently travel along a second path segment spaced apart from the first path segment by one or more intervening segments, repeating this pattern the material joining laser 26 scans along paths segments spanning the entire foil sheet F. For example, to minimize heat accumulation, thermal stresses, and distortion in the part P, each weld path Q can alternate between scanning along segments adjacent opposite ends of the foil sheet F.

In other embodiments, instead of welding the foil sheet F to the underlying layer by scanning the material joining laser 26 along a continuous weld path comprising parallel weld segments, the foil sheet is joined to the underlying layer in a substantially uniform manner by spot welding a matrix of spot welds along the surface of the foil sheet that overlap one another along their widths. This variation is discussed further below in connection with the discussion below of manufacturing amorphous alloy components.

Referring to FIGS. 4 and 5 and returning to the embodiment in which the joining laser travels a continuous path making a continuous weld rather than a spot weld, the weld dimensions and distance d2 between adjacent path segments are preferably such that at least about 40% (e.g., about 50%) of the width Wi of the weld at the top surface of the foil sheet F in each weld path segment overlaps the width of the weld at the top surface of the foil sheet in an adjacent weld path segment. Likewise, the weld dimensions and distance between adjacent path segments are preferably such that the weld extends substantially continuously across the bottom surface of the respective foil sheet F. For example, there is at least a marginal amount overlap between the width Wii of the weld in each path segment and an adjacent segment. The resulting weld joins each foil sheet F to the respective underlying layer in a substantially uniform manner that provides good strength along the x, y, and z axes of the manufactured part P.

The photograph of FIG. 5 shows a solidification pattern at the top surface of the foil sheet F2 after being welded to an underlying layer. Although the weld pattern is visible, the top surface remains quite smooth after welding. The surface roughness was measured at a level of about 10 µm. Thus, in one or more embodiments, the material joining laser system 14 is configured to form a part P with a welded surface having an unfinished surface roughness of less than about 20 µm.

Figure 6:
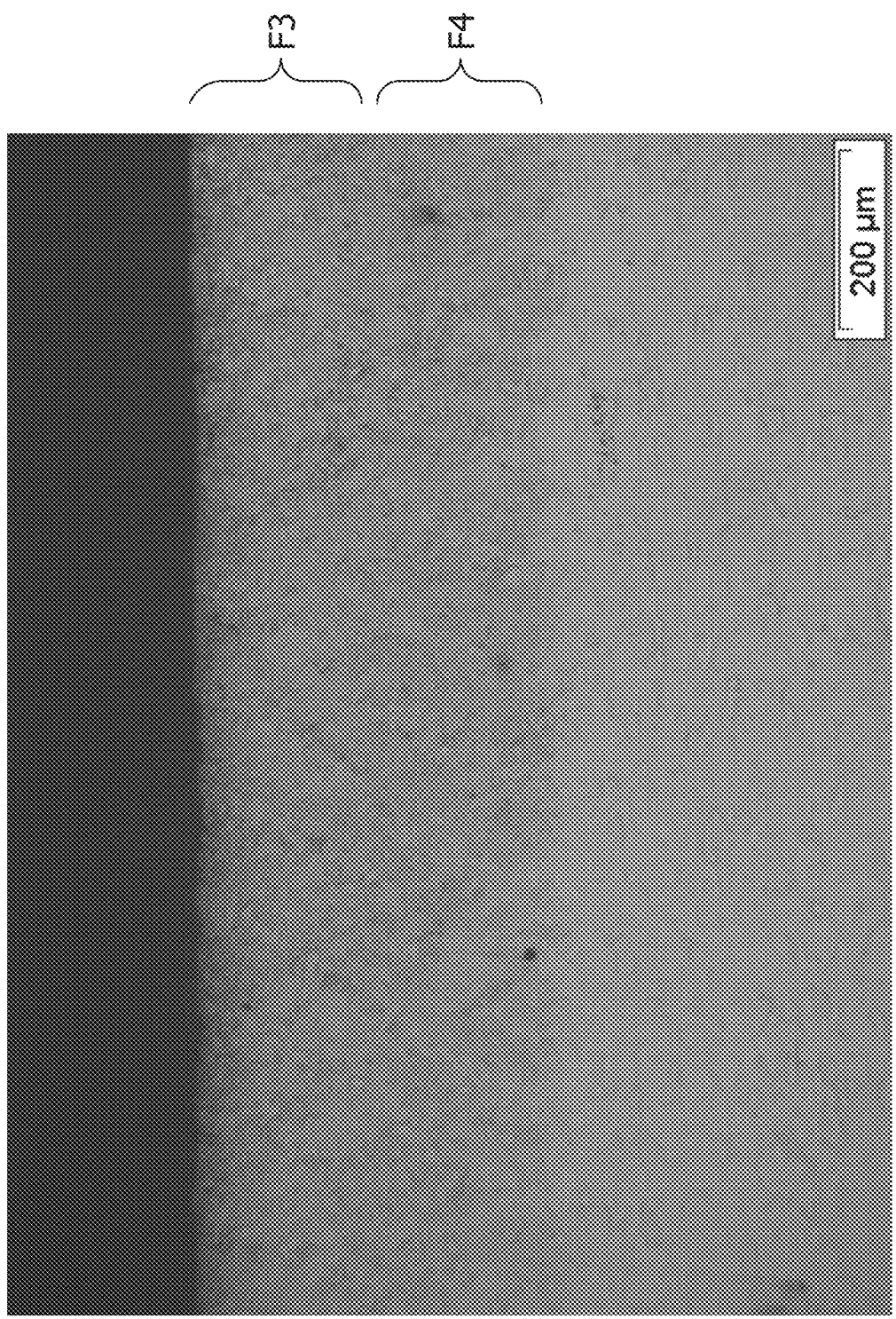
FIG. 6 is a photograph of a cross section of a first foil sheet after being joined to a second foil sheet by the additive manufacturing system.

Referring to FIG. 6, the exemplary material joining conditions and system described above were used to join a first foil sheet F3 to a second foil sheet F4. FIG. 6 shows a photograph of a cross section of the foil sheets F3 and F4 after being fused together. As is evident from the photograph, the first foil sheet was fused to the second foil sheet F4 in a substantially uniform manner. No porosity or microcracking is evident, and the two foil sheets F3, F4 are scarcely distinguishable. An apparent absence of microcracking and porosity and total fusion between a foil sheet and an underlying layer are not, however, narrowly critical to a foil sheet being joined to the underlying layer in a substantially uniform manner.

Referring again to FIG. 3, the material removal system 16 is configured to remove material from any one or more of the n foil sheets F to shape the foil sheets as the part P. More specifically, the controller 20 is operatively connected to the material removal system 16 to use shape data indicative of a shape of each of the n slices S of the part P to remove material from the sheets F to shape each of the sheets to correspond in shape with a respective one of the slices. In the illustrated embodiment, the material removal system 16 is a material removal laser system configured to generate a material removal laser 46. But in other embodiments, other types of material removal systems (e.g., machining systems such as multi-axis mills, etc.) may also be used without departing from the scope of the invention.

Any suitable material removal laser system may be used for the material removal laser system 16. In the illustrated embodiment, the material removal laser system 16 includes a Q-switched laser generator 50, half wave plate 52, and beam expander 54. Other laser generators besides Q-switched laser generators may also be used, but a Q-switched laser generator may be preferable to produce a laser 46 of high instantaneous power for clean cutting of the foil sheets F. In one or more embodiments, the laser generator 50 is configured to generate a pulsed material removal laser 46. For example, the material removal laser can have a pulse having a pulse duration of from about 10 ns to about 600 ns (e.g., about 30 ns). Shorter pulse durations are thought to improve the quality of cuts formed in the foil sheets F by reducing the thermal effects of the laser 46 on the foil. In certain embodiments, the laser generator 50 is configured to generate a material removal laser 46 having an ultraviolet wavelength. In some embodiments, the material removal laser generator 50 is configured to generate a material removal laser 46 having a wavelength of from about 266 nm to about 10,640 nm (e.g., about 355 nm). The laser generator 50 can, in one or more suitable embodiments, be configured to generate a material removal laser 46 having a maximum power of from about 3 W to about 800 W (e.g., about 10 W), a laser pulse energy of from about 50 µJ to about 150 µJ (e.g., about 75 µJ), and a pulse repetition rate of from about 5 kHz to about 100 kHz (e.g., about 20 kHz). One suitable embodiment of a material removal laser generator 50 is a Coherent AVIA-355X laser generator, available from Coherent Inc. of Santa Clara, Calif. This material removal laser facilitates removal of material by forming a cut through the uppermost layer or layers, such that the alloy material on one side of the cut is physically separated and can be physically removed away from material on the other side of the cut. The process therefore involves cutting material away from one or more of the alloy foil sheets by slicing through the foil sheet and separating foil sheet segments not joined to the underlying layer to shape the alloy foil sheets to correspond in shape with one or more respective slices of the metal alloy component. It does not operate by ablating away, i.e., vaporizing away, material. While some minor vaporization may occur, such as vaporization of less than 10% of material impacted by the laser beam, the removal mechanism is by cutting, so in that sense this material removal laser is properly characterized as a cutting laser and not an ablating laser.

A first segment 46a of the material removal laser 46 extends along the y axis from the laser generator 50 to the half wave plate 52. The half wave plate 52 changes a polarity of the laser 46 in a second segment 46b. The second segment 46b extends further along the y axis to the beam expander 34, which expands the size of the laser 46 in a third segment 46c. The third segment 46c extends further along the y axis to a turning reflector 56. The turning reflector 56 turns the laser 46 so that a fourth segment 46d extends away from the turning reflector 56 along the z axis. The fourth segment 46d of the material removal laser 46 is received by a focusing lens 58, which focuses a fifth, cutting segment 46e at a focal point. In one or more embodiments, the focusing lens 58 has a focal length which focuses the welding segment 46e of the material removal laser 46 on a beam spot spaced apart from the focusing lens along the z axis. In certain embodiments, the focal length is from about 5 cm to about 20 cm (e.g., about 10 cm).

Preferably, the focal lengths of the cutting segment 46e and welding segment 26c and z axis positioning of the focusing lenses 42, 58 are such that the beam spots of the respective lasers 46, 26 are aligned with one another along the z axis. The focusing lens 58 is, like the focusing lens 42, mounted on the z movement stage 44 for conjoint movement along the z axis. As will be explained in further detail below, the beam spot of the material removal laser 46 is preferably aligned along the z axis with each new foil sheet F that is positioned on the platform 22 to sequentially remove material from each of the foil sheets. Aligning the beam spots of the two lasers 26, 46 enables alternating use of the material joining laser 26 and material removal laser 46 on a respective sheet of foil F without adjusting the z movement stage 44.

Various material removal atmospheres can be created at the foil sheet F from which material is being removed. For example, atmospheres of ambient air, compressed air, ambient argon, compressed argon, etc. may be suitable depending on the configuration of the laser system 16. In the illustrated embodiment, the laser system 16 includes a coaxial gas nozzle 60 at the distal end of the focusing lens 58. The gas nozzle 60 is configured to dispense a coaxial stream of compressed assisting gas along the z axis with the cutting segment 46e of the material removal laser. Any suitable assisting gas, such as argon, may be used without departing from the scope of the invention. The gas preferably blows away dross and debris created during material removal to achieve a clean cut and prevent oxidation.

As is the case for the material joining laser system 14, any suitable material removal movement system operatively connected to the controller may be used to move the material removal laser 46 and platform 22 relative to one another for removing material from specified locations of the foil sheets F to shape the foil sheets to correspond in shape with the slices S of the part P. In the illustrated embodiment, the material removal movement system includes the x-y axis movement stage 23 and the z axis movement stage 44. An x-y movement stage may be preferable to a laser scanner for the material removal laser system so that the focusing lens and coaxial gas dispensing nozzle can be mounted relatively close to the foil sheets. As mentioned above, the x-y axis movement stage is operatively coupled to the platform 22 to move the platform 22 along the x and y axes, and the z axis movement stage 44 is operatively connected to the focusing lens 58 to move the focusing lens along the z axis. Movement of the focusing lens 58 along the z axis moves the material removal laser 46 along the z axis relative to the platform 22, and moreover, moves the beam spot of the material removal laser 46 relative to the foil sheets F stacked upon the platform 22.

There are embodiments where the material removal laser moves in the z-direction relative to the base, embodiments where the base moves in the z-direction relative to the material removal laser, and embodiments where both the base and material removal laser move in z-direction relative to each other. In the embodiment illustrated here, the controller 20 is configured to control the material removal laser system 16, x-y axis movement stage 23, and z axis movement stage 44 to sequentially remove material from each foil sheet F after it is positioned on the platform 22. For example, in one embodiment, the controller 20 is configured to control the manufacturing system 10 to remove material from each foil sheet after it has been preliminarily attached to the underlying layer, but before the material joining system 14 has permanently fused the respective sheet to its underlying layer. In other embodiments, the controller 20 is configured to control the manufacturing system 10 to remove material from each foil sheet F after being permanently fused to the underlying layer by the material joining laser system 14. In a preferred embodiment, the controller 20 is configured to adjust the z axis movement stage 44 each time a new foil sheet F is layered onto the platform 22 to position the beam spot in operative alignment with the respective foil sheet along the z axis. In one or more embodiments, the controller 20 is configured to receive shape data about each of the slices S of the part P and to use the shape data for each slice to control the x-y movement stage 23 to remove material from the respective sheet F, thereby shaping it to correspond in shape with the respective slice. In a preferred embodiment, the x-y movement stage 23 moves the platform 22 relative to the material removal laser 46 at from about 50 mm/min to about 350 mm/min (e.g., about 200 mm/min).

Figure 7:
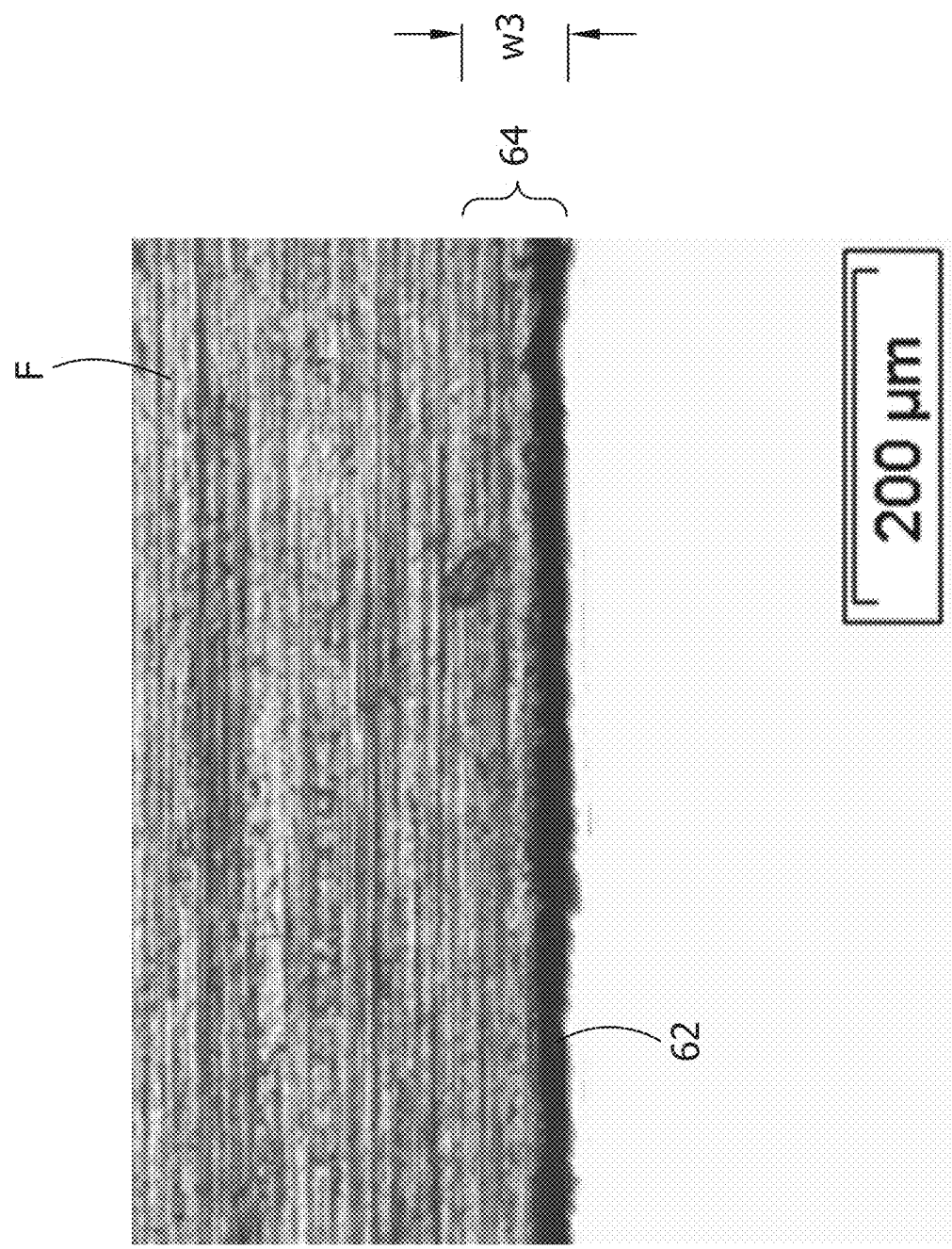
FIG. 7 is photograph of an edge of a foil sheet after having been cut by the additive manufacturing system.

The cutting speed of the material removal laser system 16 affects the quality of the resulting part P. Referring to FIG. 7, in exemplary embodiments, the material removal laser system 16 is configured to form one or more cuts 62 along one or more edge margins of the foil sheet F defining a location where material is removed. Preferably the material removal laser 46 is configured to form a cut in the foil sheet F with which it is operatively aligned without damaging the underlying layer. Where material is removed from foil by a laser, a heat affected zone 64 develops along the edge margins of the cuts 62. In one or more embodiments, the heat affected zone 64 has a width w3 that is less than about 25 μm (e.g., about 20 μm). As shown in FIG. 7, the relatively small heat affected zone width produces relatively clean cuts 62, with minimal burring and visible thermal effects. Using multiple passes of the material removal laser 46 over the foil sheets F at higher cutting speeds is thought to produce higher quality cuts 62.

Figure 8:
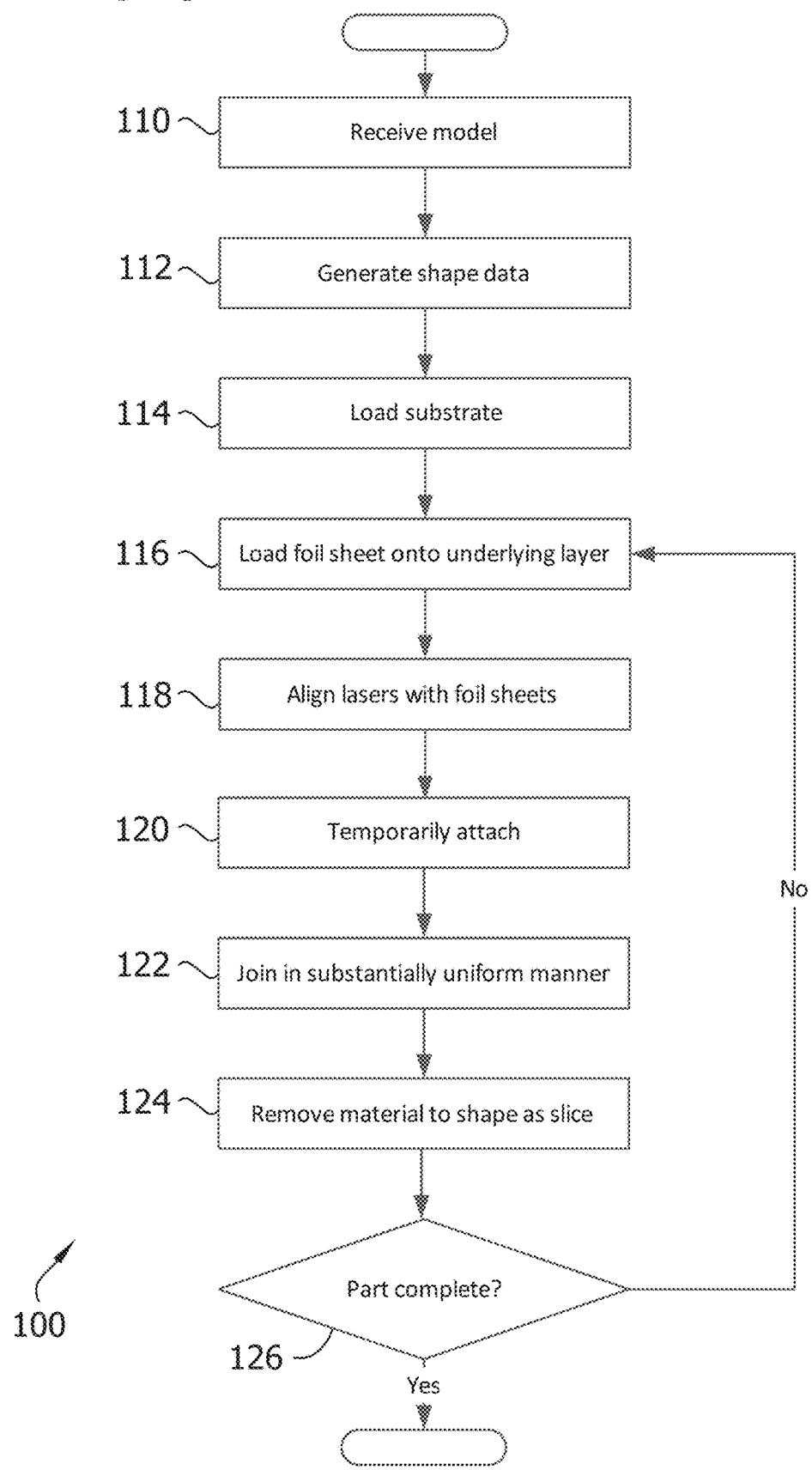
FIG. 8 is a flow chart illustrating the steps and decision block of a method of manufacturing a metal part using the additive manufacturing system.

Referring to FIG. 8, an exemplary method 100 of using the additive manufacturing system 10 will now be described. In the following discussion, reference will be made to the controller 20, which controls various aspects of the foil sheet positioning system 12, material joining system 14, and material removal system 16. It will be understood that more than one control module may be used to control the method 100. For example, separate control modules (e.g., separate controllers) may be used to control the material joining laser system 14, material removal system 16, x-y movement stage 23, and z movement stage 44. Alternatively, a single control module may be used to implement the entire control system without departing from the scope of the invention. Moreover, various aspects of the method 100 that are described as being performed by the controller 20 may be performed manually without departing from the scope of the invention.

At an initial step 110 of the method 100, the controller 20 receives a three dimensional model of the part P. After receiving the model, the controller 20 uses shape slicing software to generate shape data from the model at step 112. The shape data divides the three dimensional model into separate models of the slices S of the part P. The controller 20 further converts the shape data into machine instructions for controlling the manufacturing system 10. It will be understood that the controller 20 could receive shape data or machine instructions from another source instead of compiling its own shape data and machine instructions using a three dimensional model.

At step 114, the user of the system 10 loads the substrate J onto the platform 22. After loading the substrate J onto the platform 22, the user loads a first one of the n foil sheets F onto the substrate J (i.e., the underlying layer of the first sheet) (step 116). If an automated foil loading system is used, the controller 20 can control the system in carrying out step 116. After the first foil sheet F is loaded onto the substrate J, the controller operates the z movement stage 44 to operatively align the material joining laser 26 and material removal laser 46 with the newly loaded foil sheet (step 118). The controller 20 then operates the material joining laser system 14 to preliminarily attach the foil sheet F to the substrate J (step 120). As discussed above, the illustrated additive manufacturing system 10 preliminarily attaches the foil sheets F to their underlying layers by spot welding, but other methods of preliminarily or temporarily attaching may also be used without departing from the scope of the invention.

With the foil sheet F temporarily or preliminarily attached to the substrate J, the controller 20 controls the material joining laser system 12 to join the sheet to the underlying layer in a substantially uniform manner (step 122). As discussed above, the controller 20 operates the laser generator 30 and scanner 40 to move the material joining laser 26 along the weld path Q, thereby creating substantially continuous fusion between the foil sheet F and the underlying layer across the interface therebetween. Preferably, the controller 20 prevents the material removal laser system 16 from generating the material removal laser 46 as the material joining laser system 14 is operating to join the foil sheet F to the underlying layer.

After joining the foil sheet F to the underlying layer, the controller 20 controls the material removal laser system 16 to remove material from the foil sheet to shape the foil sheet to correspond in shape with a corresponding slice S of the part P (step 124). The controller 20 preferably prevents the material joining laser system 14 from generating the material joining laser 26 during step 124. It will be understood that steps 122 and 124 could be reversed without departing from the scope of the invention. During step 124, the controller 20 uses the shape data about the slice S to move the x-y movement stage 23 to position the material removal laser 46 at locations along the foil sheet F where material must be removed. Any cut foil waste remaining on the machine may be manually or automatically removed from the foil loading system 12.

If, at decision block 126, the controller 20 determines that the part P is not completely manufactured, the method 100 returns to step 116. Another sheet F is loaded onto the platform 22 atop an underlying layer. The controller 20 repeats steps 116-124 for respective sheets of foil F until the n sheets of foil form the n slices of the part P. In exemplary embodiments of the method 100, the resulting part P has good strength characteristics that lack substantial directional dependence.

Example 1

Figure 9:
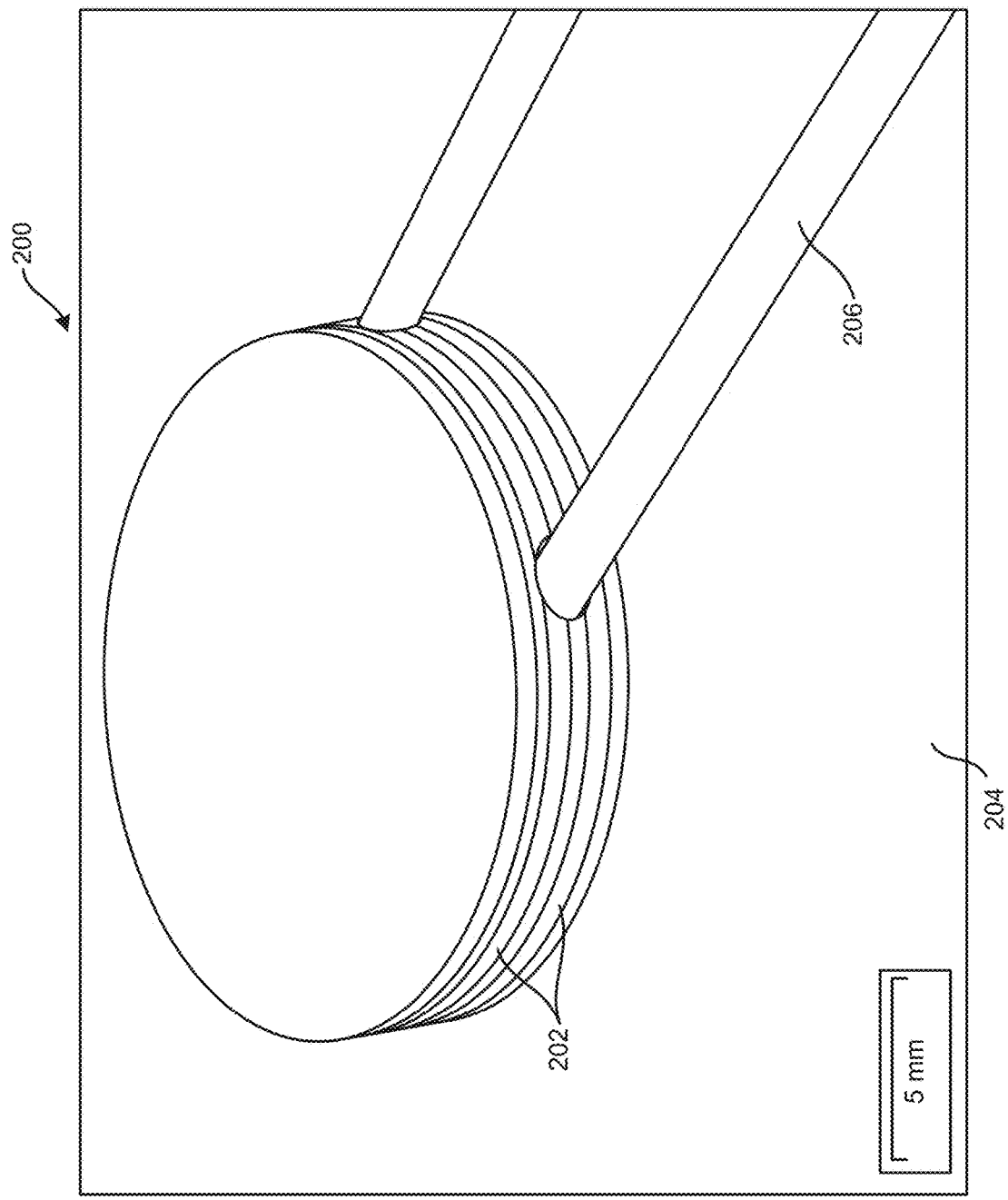
FIG. 9 is an illustration of a metal part formed using the additive manufacturing system.

FIG. 9 is an illustration of an exemplary part 200 that was formed by performing the method 100 using the additive manufacturing system 10. The part 200 comprises n slices 202 that were each formed from a respective foil sheet F that had material removed therefrom the shape the sheet to correspond in shape with the respective slice. The slices 202 are stacked upon a substrate layer 204 along the z axis. And as discussed above, each slice 202 is joined to the underlying layer by a weld that extends along a weld path Q. The illustrated part 200 is embedded with a sensor 206. The process for forming a sensor embedded part 200 is substantially the same as discussed above for part P. Foil sheets along a certain segment of the z axis are shaped to define a channel for receiving the sensor 206. With the channel partially formed, the sensor 206 is positioned on the part 200 and subsequent foil sheets are formed atop the sensor to enclose the sensor in the part. In some instances, it is desirable to apply a buffer coating to the sensor before positioning it in the channel. It also may be desirable to dimension the channel slightly larger than the sensor to create a small gap between the part and sensor.

As shown in the illustration, the system 10 and method 100 produced a part 200 that has relatively smooth top and side surfaces. The surface roughness of the top surface was measured at a level of about 10 μm. The side surfaces are rougher than the top surfaces due to imperfections caused by manually stacking the foil sheets F atop one another along the z axis. It is believed that by incorporating an automated foil stacking system, the smoothness of the side surfaces can be improved.

Example 2

Figure 10:
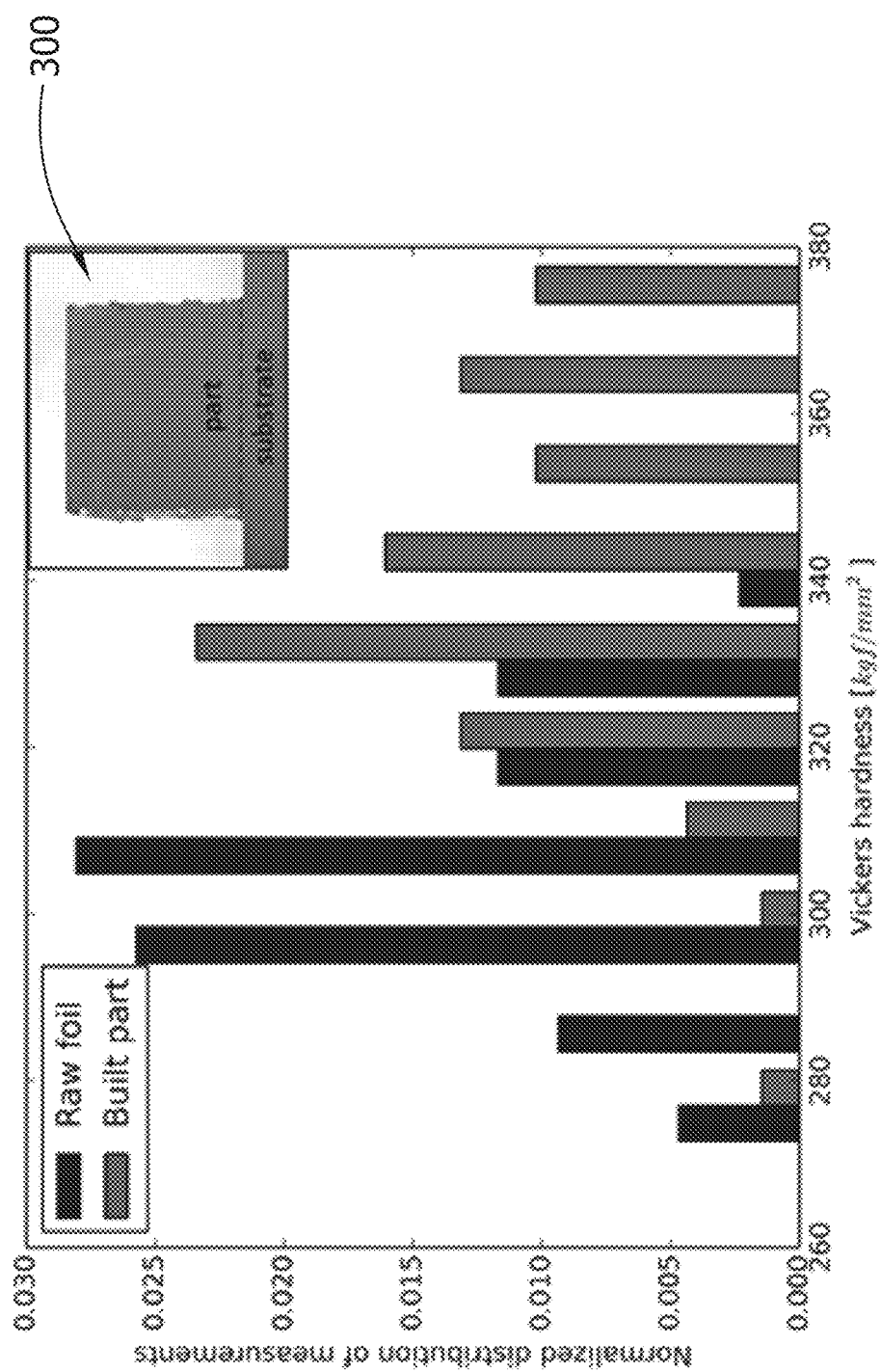
FIG. 10 is a table showing the results of microhardness testing performed on a cubic part formed by the additive manufacturing system and the raw foil from which the part was formed with a photograph of a cross section of the cubic part superimposed on the table.

Referring to FIG. 10, another 4-mm cube 300 was manufactured by the additive manufacturing system 10 according to the method 100. The cube 300 was subjected to micro-hardness testing to evaluate the effectiveness of the manufacturing system and method at producing high strength parts. The micro-hardness testing was generally performed according to the standard of ASTM E8/E8M 2009 edition, page 6, adapted for a smaller specimen. The micro-hardness of the raw foil was measured, along with the micro-hardness of the fabricated cube 300 at a matrix of 64 different points on its cross-section. The results of the micro-hardness testing are illustrated in FIG. 10. The average micro-hardness for the fabricated part 300 is 339.8 kgf/mm$^2$ (Vickers hardness, Hv0.1/5) with the standard deviation of 20.8 kgf/mm$^2$. For the raw foil, the average micro-hardness is 283.8 kgf/mm$^2$ with the standard deviation of 13.9 kgf/mm$^2$. Thus, the fabricated part has improved micro-hardness as compared with the raw foil. The micro-hardness of the fabricated part is quite uniform throughout the volume of the part and the slight increase of the micro-hardness in the fabricated part as compared to the raw material is attributed to the fast cooling and the change of grain size and orientation due to solidification in laser welding.

In addition to hardness, various samples of parts P fabricated using the system 10 and method 100 were tested for tensile strength. The results of the testing showed that the tensile strength of the parts in the x-y plane was greater than that of the original foil. For example, for a raw foil having an AISI 1010 tensile strength of about 551 MPa, the tested tensile strength of fabricated parts were found to be from about 950 MPa to about 1015 MPa. Along the vertical z axis, tested parts also show improved tensile strength as compared with the raw foil. For example, for a raw foil having an AISI 1010 tensile strength of about 551 MPa, the tested tensile strength of fabricated parts along the z axis was found to be from about 700 MPa to about 750 MPa. It is thought that the z axis tensile strength can be further improved by optimizing the process to minimize unwelded gaps between adjacent foil layers.

Amorphous Alloy Components

One preferred embodiment of the system and method is directed to the manufacture of amorphous alloy components. A main feature of this embodiment is that the welding of each layer to an underlying layer is performed in a super cooled chamber to promote the rapid quenching required to preserve and impart an amorphous microstructure. The foil layers used in this embodiment are thin pieces of amorphous alloy, such as in the range of 50 to 500 μm thick, for example between 75 and 200 μm thick, such as about 100 μm thick. Foils of this type are available from Liquidmetal Technologies, Inc. of California, USA. During the welding operation as described above, the intense heat of the laser causes the alloy to heat up to a temperature above its melting point such that it is soft enough to fuse to its underlying layer. At that point, if the alloy is allowed to air cool or is only slowly cooled, its atoms will order into a crystal structure. But if the alloy is rapidly quenched at a rate of greater than, e.g., 1° K./sec, or 10° K./sec, the atoms do not have time to order themselves into a crystal structure before the material is solidified. So by using a super cooled environment in combination with the particular laser joining technique described herein, the disordered and random microstructure of the original amorphous alloy foil is preserved, and an amorphous microstructure is thereby imparted to the component.

Figure 11:
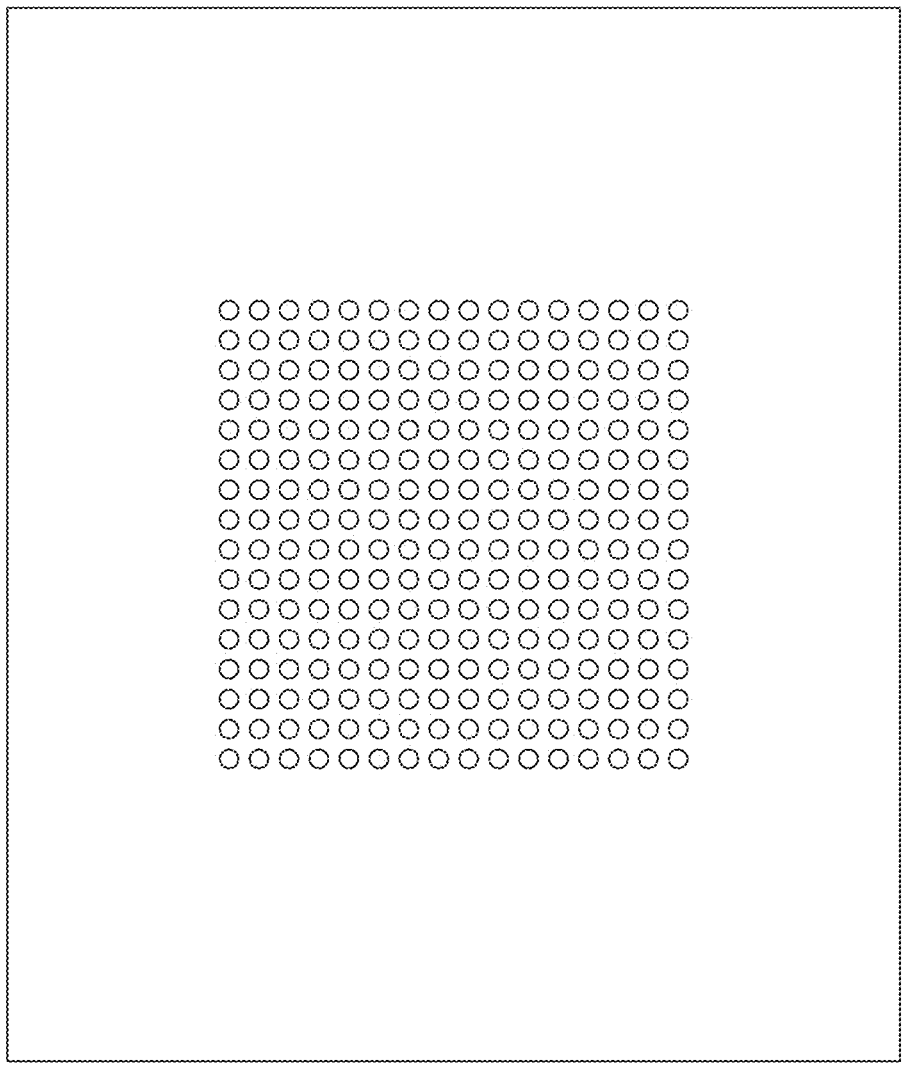
FIG. 11 is a schematic of a mask for use in a joining operation.

In one preferred embodiment, each foil sheet is temporarily fixed to the underlying layer with the aid of a masking device and spot welding. The mask consists of a plate which is between about 1 and about 15 mm thick, preferably between about 5 and about 10 mm thick. The mask contains a series of through-holes through which a spot welding laser is transmitted to spaced-apart locations on the upper layer. In one example, the mask is a metal plate of the configuration shown in FIG. 11. The mask is placed over the upper layer to be affixed to the underlayer. The thickness of the mask is not narrowly critical to the invention. The mask should be heavy enough to force the foil layer in good uniform contact with the layer below, with no gaps between the two. The mask can be pressed downward on the upper foil layer via an external mechanical force. The hole size can vary; as can the hole pattern. A laser is directed through some or all holes in the mask and down onto the upper layer to spot weld the upper layer to the underlayer. In one embodiment, this spot welding laser is operated in pulsed laser mode with the same power and wavelength parameters as the material joining laser used to create uniform bonding between a foil layer and an underlayer. In variations of the invention, the mask openings may alternatively include slots rather than or in addition to round holes as shown in FIG. 11. The openings in the mask provide unobstructed access of the laser to a free, unobstructed surface of the substrate.

Figure 12:
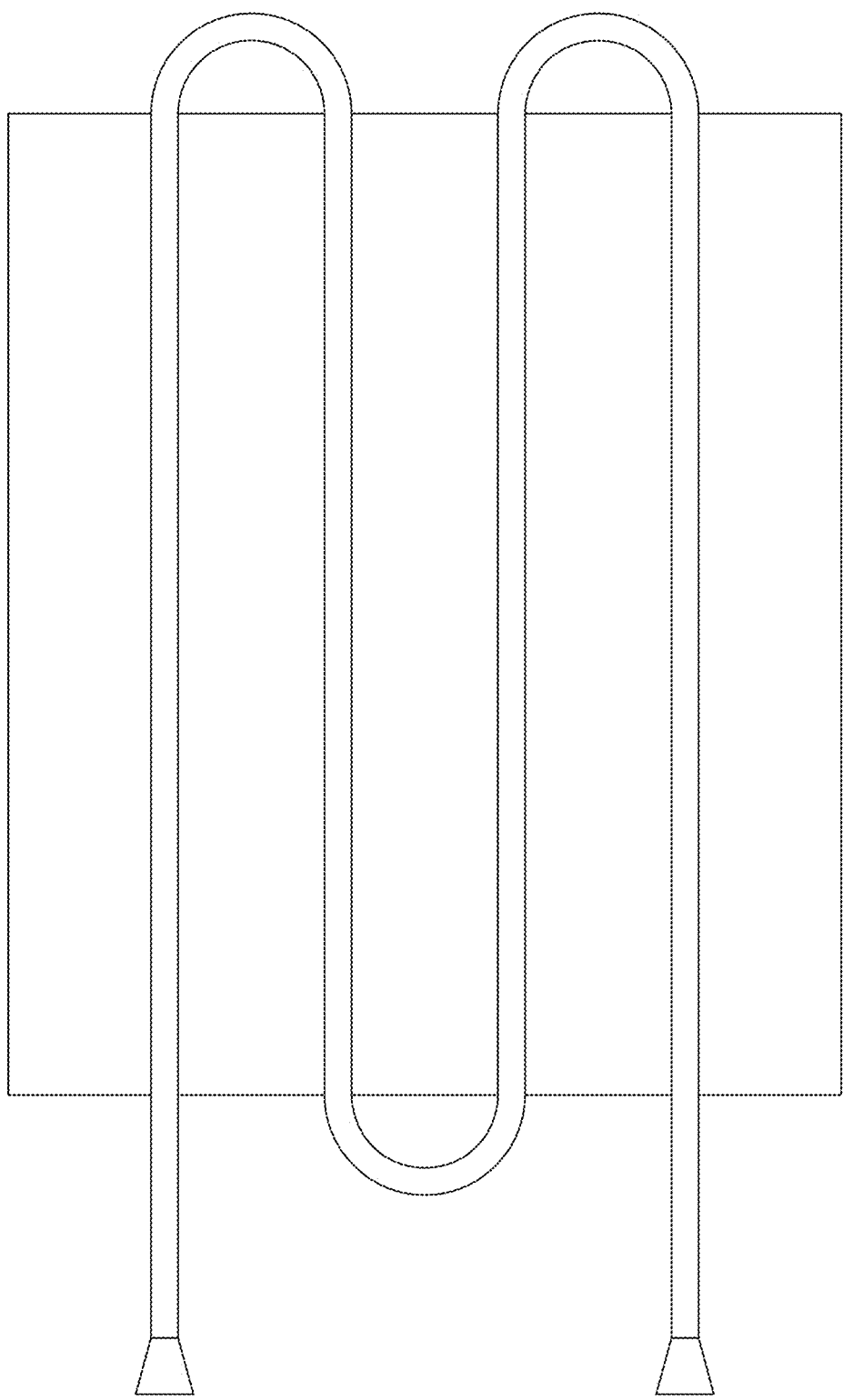
FIG. 12 is a schematic top view of a cooling plate.

In one method of this invention, rapid cooling is facilitated by implementing cooling within the mask placed on the top of the substrate. The mask is in one aspect used at the first step for spot welding to fix a new foil onto the structure or underlying layer. But a mask can also be used in the subsequent welding operation to finally and completely join a foil layer to the underlying structures. And this mask can be made with internal passages for coolant (liquid nitrogen or argon), to provide very efficient cooling effect on the structure, functioning as a heat exchanger. The mask is pressed on the foil while it is being welded to the underlying layer. This provides an excellent way to cool the structure and at the same time to prevent the foil from being distorted during welding In one method according to this invention, rapid cooling is facilitated by use of a heat exchanger under the base. One example of such a heat exchanger is shown in FIG. 12. There is a copper tube embedded in a steel plate, and a cool fluid such as liquid nitrogen or liquid argon is circulated through the copper tube. Liquid nitrogen is preferred due to its cost advantage over liquid argon.

Figure 13:
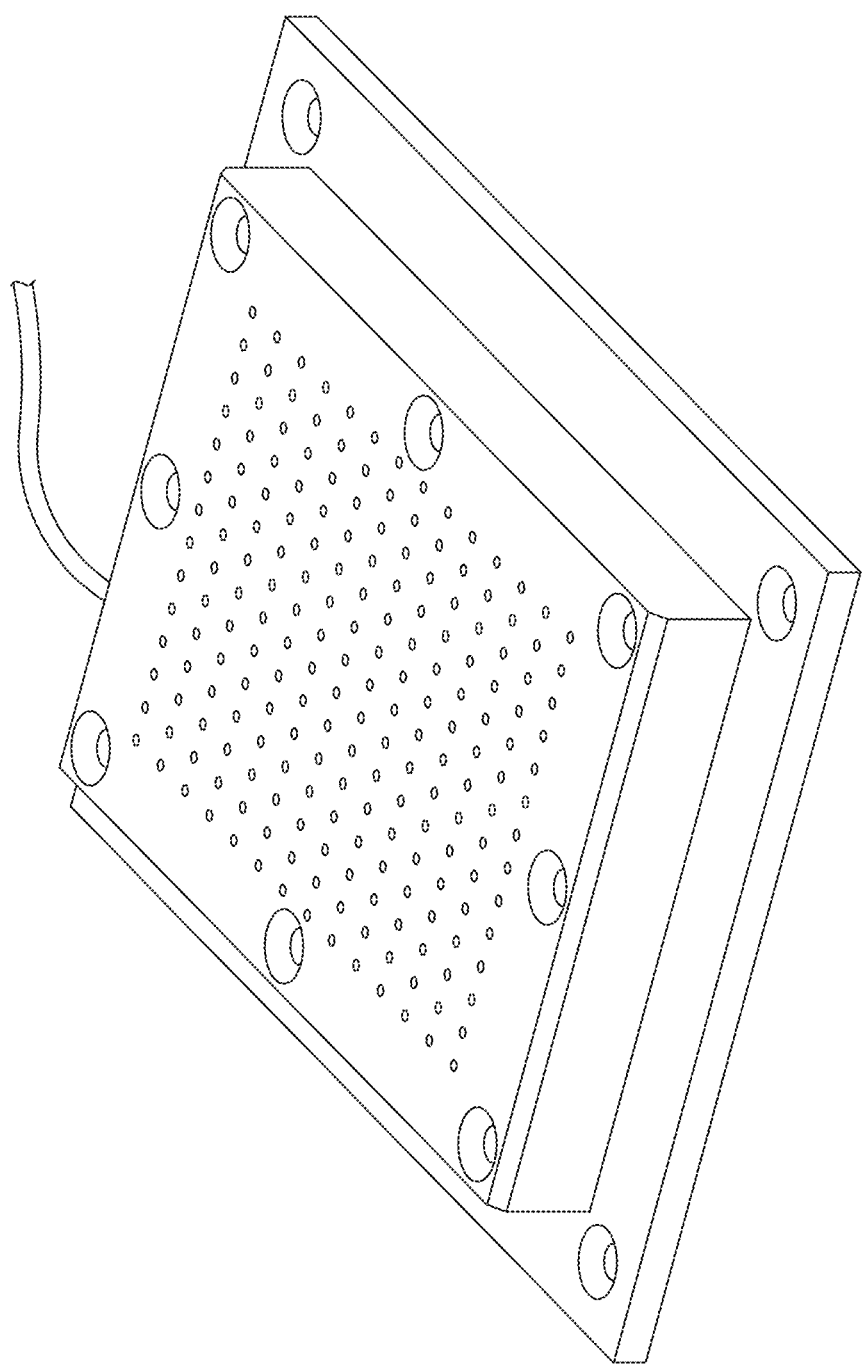
FIG. 13 is a schematic of a top view of a cooling chamber floor.
Figure 14:
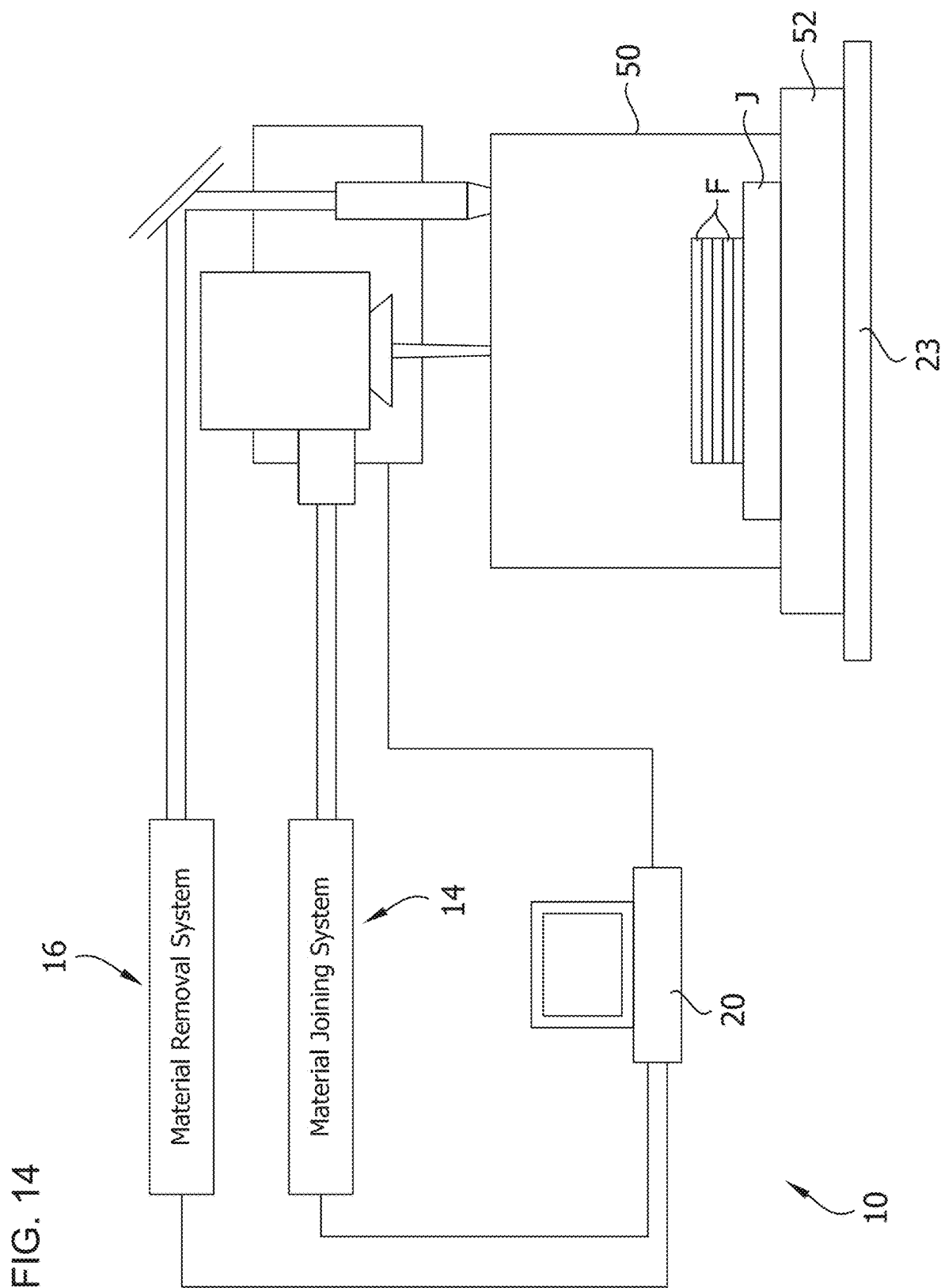
FIG. 14 is a schematic of a manufacturing system including a cooling chamber.
Figure 15:
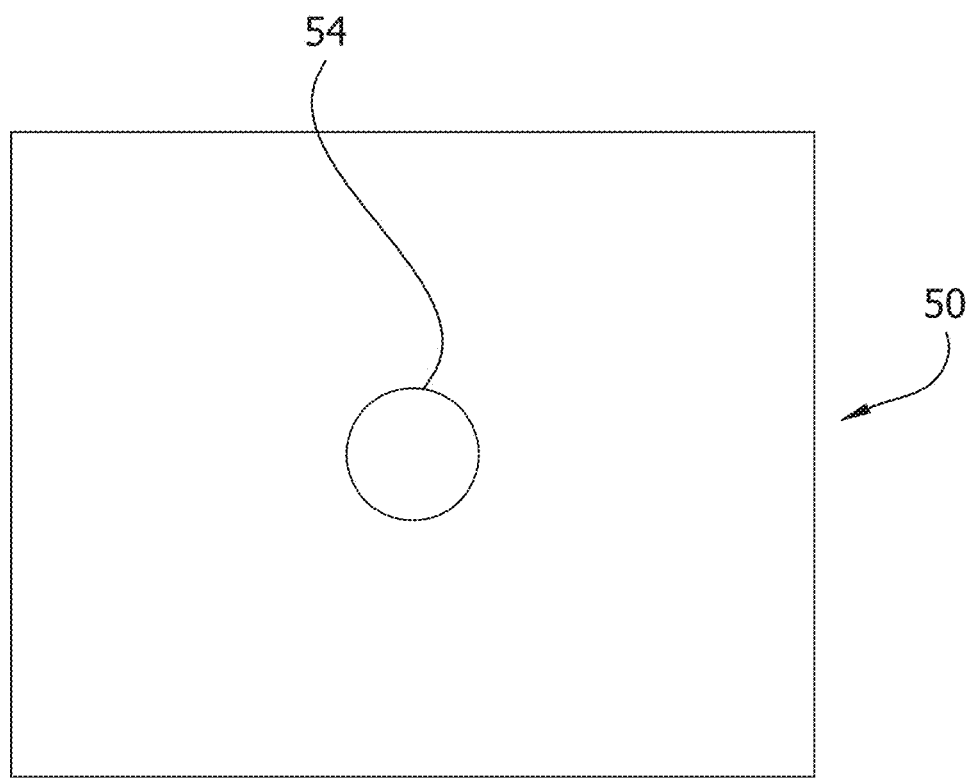
FIG. 15 is a schematic top view of a cooling chamber.

In order to create the proper cooling environment, a preferred embodiment of the invention uses cooling chamber that comprises a chamber floor as shown in FIG. 13 which has holes through which a cooling gas is flowed into the chamber and around the workpiece. There is a cooling gas feed line that connects the chamber floor to a source of cooling gas. The assembled chamber is shown at 50 in FIG. 14. There it can be seen that the chamber 50 has side walls that rest on chamber floor 52. In the top view of the chamber shown in FIG. 15, it can be seen that there is a window 54 in the chamber roof through which the laser has direct access to the workpiece. This window in a preferred embodiment is coated glass. It does not melt as the laser beam passes through it because at this position in the laser beam's path, it is sufficiently remote from the focal point that it is not so intense as to melt the glass. In the preferred embodiment, the cooling gas is argon vapor. In addition to cooling, the argon vapor provides shielding of the workpiece from exposure to oxygen during the welding and cutting operations. Nitrogen may also be used for the cooling and shielding gas, but some alloys are sensitive to nitrogen. In a preferred embodiment, the atmospheric temperature around the workpiece is below about minus 50° C., such as below about minus 100° C. Of course the temperature directly on the workpiece will vary depending on whether the temperature is measured at a spot being welding, not yet welded, or very recently welded. While the embodiment illustrated here shows a cooling and shielding environment in a chamber that encompasses essentially just the workpiece, it is also possible to use a much larger chamber that encompasses the workpiece plus parts of the laser apparatus or even the entire laser apparatus.

When the laser beam passes through the window 54 in the top of the chamber 50, it is still remote from the workpiece and is therefore defocused, and not yet focused. This is important because in accordance with this invention, the focused welding and cutting laser beams do not transmit through any glass, polymer, or plastic materials at or near (e.g., within 5 cm of) the workpiece. This direct access of the focused laser beam to the workpiece is important for various reasons. Firstly, the laser beams are of such high intensity to as to weld and cut alloy material. The laser beams would therefore destroy any glass, polymer, or plastic material through which they might be directed in such focused condition. So the process affirmatively avoids any such transmission. Also, transmission through materials can have a tendency to deflect or refract the laser and therefore negatively impact the precision of the joining and cutting operations. It is also important, that there be no interference with the laser at the point where the focused laser beam strikes the alloy foil sheet to be welded. So the glass window 54 remote from the workpiece surface is the last material through which the laser beam passes before it strikes the workpiece. The process therefore involves joining each of the alloy foil sheets to the respective underlying layer using a material joining laser after each respective sheet is stacked on the respective underlying layer by striking a focused laser beam of the laser on a free and unobstructed surface of the foil sheet to melt and weld each alloy foil sheet to its respective underlying layer. This is important because if there were glass or polymer against the workpiece and through which the focused beam would pass, the glass or polymer would tend to melt or would at least stick to the molten metal of the workpiece. The glass or polymer would also risk deflecting the laser beam and therefore reduce precision. So the surface struck by the focused laser beam in this embodiment as well as in other embodiments not necessarily involving amorphous alloys is a free and unobstructed surface. That the surface is free and unobstructed, however, does not preclude the use of a mask, as described herein. Free and unobstructed in this sense means that the laser does not have to travel through any polymer, glass, or other material against or near the substrate surface. However, the laser may pass through openings in a mask. Through these empty openings, the laser has a direct unobstructed path to the substrate.

Because both the laser welding and subsequent laser cutting involve heating of the workpiece, it is preferable that both the joining and laser cutting operations are performed in the super cooled atmosphere described herein.

In a currently preferred embodiment involving amorphous alloy foils, instead of welding the foil sheet F to the underlying layer by scanning the material joining laser 26 along a continuous weld path comprising parallel weld segments, the foil sheet is joined to the underlying layer in a substantially uniform manner by spot welding a matrix of spot welds along the surface of the foil sheet that overlap one another along their widths. The final connection is uniform in that every location on the layer has been impacted by the laser and all the weld spots overlap with each other, so the entire layer has been welded. But the laser strikes themselves—the on-off, on-off, on-off associated with a series of instantaneous weld strikes—in one embodiment are not applied successively in a continuous line. Rather, a first strike is at a first location, a second strike is at a second location which is not adjacent the first location, a third strike is at a third location which is not adjacent the second location, and an $n^{th}$ strike is at an $n^{th}$ location which is not adjacent an $n-1^{th}$ location. By maintaining significant separation in space between two consecutive spot welds, heat accumulation is minimized and cooling rate is maximized. And by maintaining significant separation in time between two adjacent/overlapping spot welds, heat accumulation is minimized and cooling rate is maximized. So each successive spot weld made on the layer by the first, second, third etc. weld strikes does not overlap with a spot weld performed immediately before or it immediately after it. There may be minor exceptions, of course, such that not absolutely every spot weld is performed this way. But in the preferred embodiment, at least about 80% or 90% of the spot welds made on the layer meet these criteria of not being adjacent to or overlapping with a spot weld made immediately before it or after it. But by the end of the process, substantially the entire surface area of the layer within a designated area is spot welded to the underlying layer. This particular embodiment is especially preferred in the manufacture of an amorphous alloy component, because it facilitates rapid cooling of each successive weld spot. Because the second spot weld is performed at a location which does not overlap and is not adjacent to the first spot weld, the first spot weld cools more rapidly. The material heated up by the second spot weld does not overlap and is not adjacent to the material subject to the first spot weld. So the first spot weld, during the critical microseconds or seconds immediately following its creation, is completely surrounded only by cool material which is not undergoing an immediately subsequent spot weld. This allows heat from the first spot weld to dissipate faster. The same carries through to the third spot weld, etc. through to the $n^{th}$ spot weld. Each spot weld is therefore preferably made to a location which is sufficiently remote from the prior spot weld that heat from the spot weld does not significantly impact cooling of the prior spot weld. For example, in one embodiment, each spot weld—or at least about 80% or 90% of the spot welds—is made at a location which is at least about 5 mm, such as at least about 10 mm away from the immediately preceding spot weld. Also, it is preferred that making of each adjacent or overlapping or touching spot weld—or at least about 80% or 90% of such spot welds—be separated in time by at least about 1 second. What this means is that each new spot weld does not have an adjacent or overlapping spot weld that is less than 1 second old. So each new spot weld is placed where it either a) touches only other spot welds that are more than 1 second old (i.e., does not touch any weld spots younger than 1 second old), or b) touches no other spot welds. The time between two overlapping weld spots depends on the cooling conditions. So with more efficient cooling, overlapping spots can be made without as great a time gap.

While this spot welding method avoids heat accumulation, it is slower than a continuous path welding process as described above in connection with FIG. 5. A compromise between the two methods is the use of a continuous weld path as in FIG. 5, but with each linear pass being spaced apart from its immediately previous linear pass. Looking at FIG. 5, for example, there are five passes shown. In this variation, the first pass is the bottom-most left-to-right pass, and the second pass welds material which is non-overlapping and non-adjacent with respect to the first pass, and so on. So the second pass is not the pass immediately above the bottom-most pass; but rather is—referring to FIG. 5—a third, fourth, or fifth pass from the bottom. Accordingly, each pass after the first pass does not overlap with an immediately preceding pass. The method therefore involves creating a first linear weld pass across the surface of the layer, followed by a second, third, fourth, fifth, etc. pass, each of which does not overlap its immediately preceding path. While a path being presently welded does not overlap with a weld path that was formed immediately prior to the present weld path, it may overlap with a previously formed weld path. A previously formed weld path will have already undergone substantial cooling. This overlap with weld paths formed previously to the immediately prior weld path is necessary to ensure full coverage. With either spot welding or continuous/path welding, a mask may optionally be used which contains openings that allow the laser unobstructed access to a free, unobstructed surface of the substrate. This mask may also contain cooling passages and further enhance the rapid cooling of the substrate.

In the various laser operations of the invention, the position of where the laser impacts the substrate surface can be manipulated by moving the laser, or by moving the platform on which the substrate is supported, or both. For example, a series of straight-line weld paths such as three or five paths may be imparted to the foil sheet, joining the foil sheet to the underlying layer along straight lines. The laser can travel through straight slots in a mask resting on the foil sheet, to impact the free, unobstructed surface of the upper foil sheet. Then the laser can be terminated, and the platform under the substrate lowered, shifted, and raised so that fresh, unwelded strips present themselves to the unobstructed openings in the mask. In one option, the shift is slight, so the joining laser creates a path that overlaps with an immediately previously formed path. In another option, the shift is greater, so the laser does not overlap an immediately previously formed path. Then the laser is applied to these unwelded strips, thus advancing the joining process.

Comparing the material welding/joining laser to the material removal/cutting laser, the welding/joining laser in one embodiment preferably is applied at a power of between about 10 and about 2000 watts, such as about 300 watts; whereas the removal/cutting laser is applied at a power between about 1 and about 100 watts, such as about 10 watts. The welding/joining laser in one embodiment preferably is applied at a wavelength between about 355 and about 10640 nm, such as about 1064 nm; whereas the removal/cutting laser is applied at a wavelength between about 248 and about 10640 nm, such as about 355 nm. Generally speaking, the cutting laser has a lower average power with pulse mode and shorter wavelength than the joining laser which is continuous mode.

As mentioned above, in some embodiments of the invention, the layer is preliminarily affixed to the underlayer as spaced apart locations by use of a spot welding operation and the optional mask of FIG. 13 prior to application of the main welding/joining laser. The spot welding laser used in one such procedure for preliminary attachment of an amorphous alloy layer to an underlayer is applied with a power of between about 50 and about 1000 watts, such as between about 150 watts; and it is applied at a wavelength between about 355 and about 10640 nm, such as about 1064 nm.

Example 3

An amorphous foil 100 μm-thick layer of alloy LM-105 ($Zr_{65.7}Ti_{3.3}Al_{3.7}Ni_{11.8}Cu_{15.6}$ (wt. %) was welded onto a 0.75 mm-thick, alloy LM-105 amorphous plate, and then subsequent s amorphous foil 100 μm-thick layers were welded sequentially. One hundred layers were added to create a 10-mm thick cubic test sample. The sample fabrication conditions involved a laser pulsed mode with $\Delta t$=4 ms, a laser power of P=200 W, and D=430 μm, where D is the spot size, i.e., spot diameter of the beam at the plane of impact with the workpiece material. The laser welding atmosphere was an argon shielded chamber at room temperature.

Figure 16:
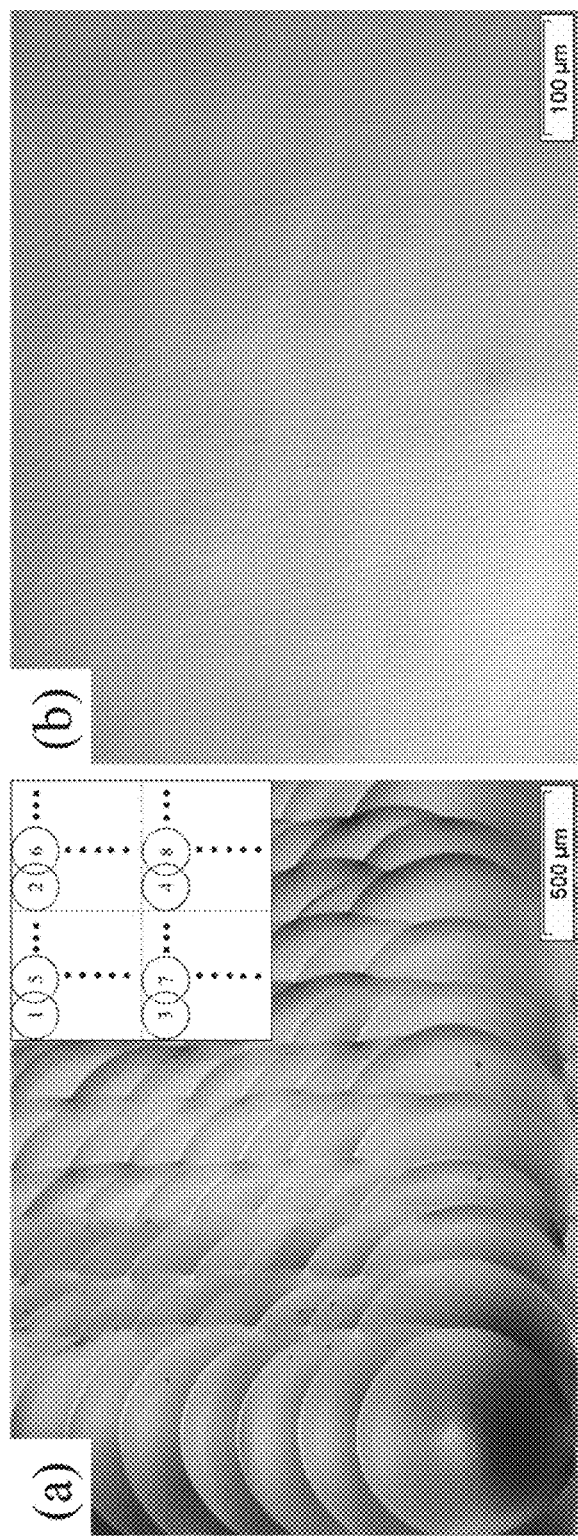
FIG. 16 depicts optical photographs of an amorphous alloy component.

FIG. 16 is a photograph of the top surface (16a) and of a cross-section (16b) of the test sample. The inset in 16a shows the spot welding sequence of the joining laser, with the first spot weld at 1, the second spot weld at 2, etc. It can be seen that each spot weld was performed remotely from the immediately previous spot weld. The fifth spot weld noted at 5 was performed at a time which was 4 seconds after the first spot weld at 1 with which it overlaps. The surface in 19a shows that overlap between adjacent weld spots was on the order of 67%. The cross-section in 19b shows high integrity joining with no cracks or voids. The density of the sample was measured by Archimedes' method to be 6.607 g/cm$^3$, which is close to the measurement of density of original foil of 6.599 g/cm$^3$.

Figure 17:
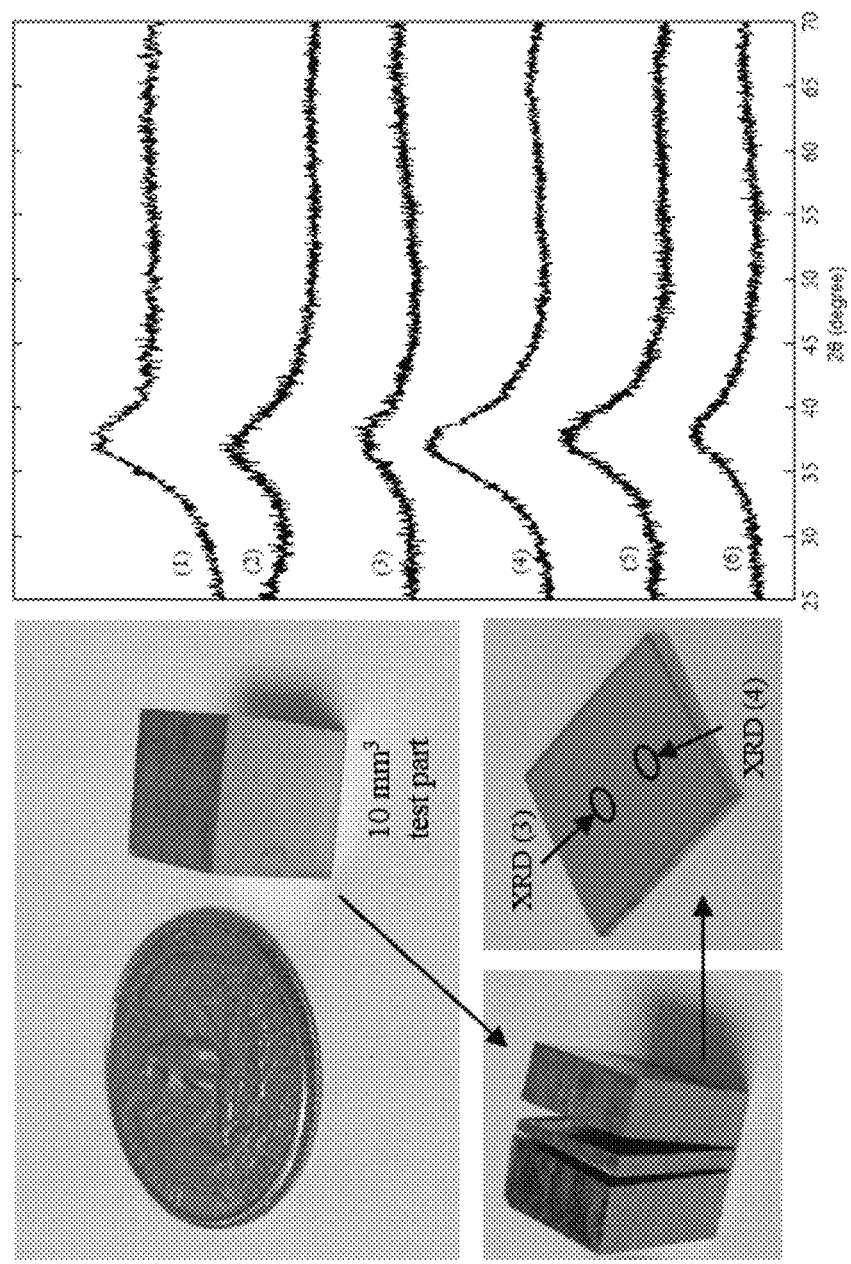
FIG. 17 depicts an amorphous cube and X-ray diffraction patterns corresponding to various locations within the cube Corresponding reference characters indicate corresponding parts throughout the drawings.

X-ray diffraction patterns were generated at various locations through the test sample to determine its microstructure and are presented in FIG. 17. Curve 5 depicts the pattern of the 0.75 mm thick amorphous alloy plate as received from the supplier. Curve 6 is the pattern for the amorphous alloy foil as received from the supplier. Curves 1 (top surface), 2 (centerline), and 3-4 (cross section) align closely with the curves 5 and 6. All of the curves contain only broad halo diffraction peaks, which indicates that the amount of crystalline phase, if any, is within the detection limit (~2%) of X-ray diffraction. Differential scanning calorimetry tests confirmed that the fabricated test sample had the same amorphous microstructure as the original plate.

Micro-hardness tests were conducted for both the original plate and the cross-section of the test part. The load applied was 0.1 kgf and the indenting time was 10 seconds. The micro-hardness of the original plate was 588.56±25.5 Hv which is very close to 570±30.6 Hv for the test part. The micro-hardness data therefore confirmed that the fabricated 3D test part remains at its amorphous microstructure.

Example 4

Following the successful construction of the fully amorphous 10-mm cubic sample of the above example by spot-welding, the same parameters were used to construct several large 3D amorphous alloy parts. The laser pulse repetition rate was set at 1 Hz in order to avoid heat accumulation in the part. For the material removal/laser cutting process, a UV laser with pulse duration of 30 ns, pulse energy of 100 mJ and repetition rate of 5 kHz were used in order to achieve smooth and clean cutting edges.

One part manufactured was a "metal fusilli pasta" part created by a continuous rotation of an ellipse pattern. Another part was a 3-mm thick amorphous "S&T" logo of the Missouri University of Science and Technology. A third part was a five-stage 3D table which includes four square stages and a semi-spherical cover on the top. The overall height of the part was measured to be 11.3 mm. A fourth part was a slipped cylinder with overall displacement of 13 mm.

It can therefore be seen that this system and method facilitate the manufacture of thick and complex components from amorphous alloys. Heretofore it has not been possible to make thicker components from amorphous alloys, because thicker components cannot be cooled quickly enough—the transfer of heat out of the interior of the component is too slow—to maintain an amorphous microstructure. But since each thin (<500 µm) layer with this new method can be cooled sufficiently rapidly to maintain and impart an amorphous microstructure, a thick part of amorphous microstructure is constructed layer by layer. In accordance with this method, therefore, the inventors have discovered a way to bypass the inherent cooling rate limitations of an alloy, and produce amorphous alloy components which essentially have no size limitations in any of the x, y, and z directions; including, for example, components which are greater than 1 cm thick in all three x, y, and z directions; such as greater than 4 cm thick in all directions; such as between 1 and 50 cm thick in each direction; for example between 4 and 50 cm in each direction. This method facilitates the production of amorphous alloy components having no practical volume limitation, including components having a bulk volume of greater than 9 $cm^3$; such as greater than 64 $cm^3$, such as between 9 and 1000 $cm^3$.

From the above description it is evident that in order to increase the cooling rate after welding, particularly for fabricating metallic glass structures, several cooling techniques are employed. One of the techniques is welding by jumping (spot welding) or through welding-path design (line welding) so that a current welding is not immediately adjacent to the most recent welding. This reduces heat accumulation. Another technique is using a cooled bottom plate to cool the substrate. The plate upon which the structure is being built is cooled by passing coolant, such as liquid nitrogen or liquid argon, inside the plate with cooling passages as shown in FIG. 12. Another technique is cooling by directly discharging liquid argon into the chamber in which the structure is being built, so it functions as a cooling chamber. The liquid argon serves both shielding and cooling purposes. And this mask can be made with internal passages for coolant (liquid nitrogen or argon), to provide very efficient cooling effect on the structure, functioning as a heat exchanger, as described above. Accordingly, a mask as described herein may be used during the initial temporary joining operation and/or during the final welding operation. These techniques facilitate successful welding, for example, of Fe-based metallic glass foils, which need very high cooling rates.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of manufacturing a metal alloy component comprising n number of slices from n number of alloy foil sheets including a first alloy foil sheet, an nth alloy foil sheet, and a plurality of intermediate alloy foil sheets, the method comprising:

sequentially stacking each of the n alloy foil sheets on top of each other such that each of the n alloy foil sheets engages a respective underlying layer comprising another of the n alloy foil sheets;

joining each of the n alloy foil sheets to the respective underlying layer using a material joining laser after each respective sheet is stacked on the respective underlying layer by striking a focused laser beam of the laser on a free, unobstructed surface of the foil sheet to melt and weld each alloy foil sheet to its respective underlying layer, wherein the laser does not travel through any polymer, glass, or other material against or near the foil sheets; and removing material away from one or more of the n alloy foil sheets to shape said one or more of the n alloy foil sheets to correspond in shape with one or more respective slices of the metal alloy component;

wherein said steps of joining each of the n alloy foil sheets to the respective underlying layer and removing alloy material from said one or more of the n alloy foil sheets are controlled based on shape data indicative of a shape of each of the n slices of the metal alloy component.

2. The method of claim 1 wherein the metal alloy is an amorphous metal alloy.

3. The method of claim 2 wherein the joining is performed in a cooling chamber containing a cooling fluid comprising argon or nitrogen gas.

4. The method of claim 3 wherein the cooling chamber has an internal temperature below about minus 50° C.

5. The method of claim 1 wherein the material joining laser is applied to the surface of the foil sheet in sequential paths that do not overlap an immediately previously formed weld path to reduce heat accumulation.

6. The method of claim 1 wherein the material joining laser is applied to the surface of the foil sheet by forming spot welds on the entire surface with each successive spot weld being formed where it does not overlap with an immediately previously formed spot weld to reduce heat accumulation.

7. The method of claim 6 wherein each spot weld is formed at a location which is at least 5 mm away from the location of the immediately previously formed spot weld.

8. The method of claim 6 wherein each spot weld is formed at a location on the surface where the spot weld does not overlap with any previous spot welds that have an age of less than 1 second.

9. The method of claim 1 comprising preliminarily attaching each foil sheet to the respective underlying layer prior to said joining.

10. The method of claim 9 wherein the preliminarily attaching comprises preliminarily attaching each foil sheet to the respective underlying layer by spot welding.

11. The method of claim 1 wherein the material joining laser passes through openings in a mask on the foil sheet to impact the free, unobstructed surface of the foil sheet, and wherein the mask has cooling passages for cooling the surface of the foil sheet.

12. The method of claim 1 wherein the metal alloy is an amorphous metal alloy, the method comprising:
sequentially stacking each of n number of amorphous alloy foil sheets on top of each other such that each of the n amorphous alloy foil sheets engages a respective underlying layer comprising another of the n amorphous alloy foil sheets;
joining each of the n amorphous alloy foil sheets to the respective underlying layer using a material joining laser after each respective sheet is stacked on the respective underlying layer by striking a focused laser beam of the laser on a free, unobstructed surface of the foil sheet to melt and weld each amorphous alloy foil sheet to its respective underlying layer, wherein the laser does not travel through any polymer, glass, or other material against or near the amorphous alloy foil sheets; and
removing material away from one or more of the n amorphous alloy foil sheets to shape said one or more of the n amorphous alloy foil sheets to correspond in shape with one or more respective slices of the metal amorphous alloy component;
wherein said steps of joining each of the n amorphous alloy foil sheets to the respective underlying layer and removing amorphous alloy material from said one or more of the n amorphous alloy foil sheets are controlled based on shape data indicative of a shape of each of the n slices of the metal amorphous alloy component.

13. The method of claim 12 wherein the joining is performed in a cooling chamber.

14. The method of claim 13 wherein the cooling chamber as an internal temperature below about minus 50° C.

15. The method of claim 12 wherein the material joining laser is applied to the surface of the amorphous alloy foil sheet in sequential paths that do not overlap an immediately previously formed path to reduce heat accumulation.

16. The method of claim 12 wherein the material joining laser is applied to the surface of the amorphous alloy foil sheet by forming spot welds on the entire surface with each successive spot weld being formed where it does not overlap with an immediately previously formed spot weld to reduce heat accumulation.

17. The method of claim 12 comprising preliminarily attaching each amorphous alloy foil sheet to the respective underlying layer by spot welding after each of said sequentially stacking step and before each of said joining step.

18. The method of claim 12 comprising preliminarily attaching each amorphous alloy foil sheet to the respective underlying layer by spot welding after each of said sequentially stacking step and before each of said joining step;
wherein the joining is performed in a cooling chamber having an internal temperature below at least about minus 50° C.;
wherein during joining the material joining laser is applied to the surface of the amorphous alloy foil sheet a) in sequential paths that do not overlap an immediately previously formed path to reduce heat accumulation, or b) by forming spot welds on the entire surface with each successive spot weld being formed where it does not overlap with an immediately previously formed spot weld to reduce heat accumulation; and
cutting material away from one or more of the n amorphous alloy foil sheets by slicing through the foil sheet and separating foil sheet segments not joined to the underlying layer to shape said one or more of the n amorphous alloy foil sheets to correspond in shape with one or more respective slices of the metal amorphous alloy component;
wherein said steps of joining each of the n amorphous alloy foil sheets to the respective underlying layer and removing amorphous alloy material from said one or more of the n amorphous alloy foil sheets are controlled based on shape data indicative of a shape of each of the n slices of the metal amorphous alloy component.

19. The method of claim 12 comprising, after said joining, cutting material away from one or more of the n amorphous alloy foil sheets by slicing through the foil sheet and separating foil sheet segments not joined to the underlying layer to shape said one or more of the n amorphous alloy foil sheets to correspond in shape with one or more respective slices of the metal amorphous alloy component.

20. The method of claim 12 wherein the material joining laser passes through openings in a mask on the amorphous alloy foil sheet to impact the free, unobstructed surface of the amorphous foil sheet, and wherein the mask has cooling passages for cooling the surface of the amorphous alloy foil sheet.

* * * * *